US012619797B2

(12) United States Patent　　(10) Patent No.:　US 12,619,797 B2
Lambourne　　(45) Date of Patent:　May 5, 2026

(54) TOPOLOGICAL MESSAGE PASSING FOR THREE DIMENSIONAL MODELS IN BOUNDARY REPRESENTATION FORMAT

(71) Applicant: Autodesk, Inc., San Rafael, CA (US)

(72) Inventor: Joseph George Lambourne, London (GB)

(73) Assignee: Autodesk, Inc., San Francisco, CA (US)

( * ) Notice: Subject to any disclaimer, the term of this patent is extended or adjusted under 35 U.S.C. 154(b) by 1197 days.

(21) Appl. No.: 17/519,264

(22) Filed: Nov. 4, 2021

(65) Prior Publication Data

US 2022/0156430 A1　　May 19, 2022

Related U.S. Application Data

(60) Provisional application No. 63/113,766, filed on Nov. 13, 2020.

(51) Int. Cl.
*G06F 30/27*　　　(2020.01)
*G06F 30/17*　　　(2020.01)
　　(Continued)

(52) U.S. Cl.
CPC .............. *G06F 30/17* (2020.01); *G06F 30/23* (2020.01); *G06F 30/27* (2020.01); *G06F 2119/18* (2020.01)

(58) Field of Classification Search
CPC .......... G06F 30/17; G06F 30/23; G06F 30/27; G06F 2119/18
See application file for complete search history.

(56) References Cited

U.S. PATENT DOCUMENTS 12,288,013 B2　4/2025　Jayaraman et al.
2014/0184598 A1*　7/2014　Quilot ..................... G06T 17/20
345/423

(Continued)

OTHER PUBLICATIONS

Balu et al., "A Deep 3D Convolutional Neural Network Based Design for Manufacturability Framework," CoRR, abs/1612. 02141,9 pages (Year: 2016).*

(Continued)

*Primary Examiner* — Kibrom K Gebresilassie
(74) *Attorney, Agent, or Firm* — Fish & Richardson P.C.

(57)　　ABSTRACT

Methods, systems, and apparatus, including medium-encoded computer program products, for computer aided design of physical structures include: obtaining a B-Rep model including parametric surfaces and associated coedges; generating feature matrices from the coedges associated with the parametric surfaces; using the feature matrices in a convolution layer of a convolutional neural network of a machine learning algorithm to recognize a collection of faces or edges in the B-Rep model, including concatenating results of transforming the feature matrices using a topological walk matrix that represents topological information for the parametric surfaces based on adjacency relationships among the coedges (e.g., including ordering information); and preparing, based on the at least one collection of faces or edges recognized by the machine learning algorithm, (i) a display of the B-Rep model to facilitate user changes or (ii) a design of the B-Rep model to facilitate manufacturing a physical structure using the B-Rep model.

62 Claims, 9 Drawing Sheets

(51) Int. Cl.
    *G06F 30/23*      (2020.01)
    *G06F 119/18*    (2020.01)

(56)       References Cited

U.S. PATENT DOCUMENTS

| | | | | |
|---|---|---|---|---|
| 2018/0012404 | A1* | 1/2018 | Tanaka | G06T 17/20 |
| 2020/0043231 | A1* | 2/2020 | Zhang | G06T 17/10 |
| 2020/0151286 | A1 | 5/2020 | Willis et al. | |
| 2022/0318636 | A1 | 10/2022 | Jayaraman et al. | |
| 2022/0318637 | A1 | 10/2022 | Jayaraman et al. | |

OTHER PUBLICATIONS

Al-wswasi et al., "A Survey on Smart Automated Computer-Aided Process Planning (ACAPP) Techniques," The International Journal of Advanced Manufacturing Technology, 2018, 97:809-832.

Ansaldi et al., "An Edge-Face Relational Scheme for Boundary Representations," Computer Graphics Forum, 1985, 4(4):319-332.

Babic et al., "A Review of Automated Feature Recognition with Rule-Based Pattern Recognition," Computers in Industry, 2008, 59:321-337.

Balu et al., "A Deep 3D Convolutional Neural Network Based Design for Manufacturability Framework," CoRR, abs/1612.02141, 2016, 9 pages.

Baumgart et al., "Winged Edge Polyhedron Representation," Technical Report, 1972, 44 pages.

Bharadwaj, "Inception of a Cyber-Infrastructure for Product Design Data and Evaluation of a Customized Multi-View Convolutional Neural Network for 3D Cad Model Classification," Thesis in Industrial Engineering, 2020, 71 pages.

Bouritas et al., "Neural 3D Morphable Models: Spiral Convolutional Networks for 3D Shape Representation Learning and Generation," 2019 IEEE/CVF International Conference on Computer Vision (ICVV), 2019, 10 pages.

Cao et al., "Graph Representation of 3D CAD Models for Machining Feature Recognition with Deep Learning," Proceedings of the ASME 2020 International Design Engineering Technical Conferences and Computers and Information in Engineering Conference, 2020, 11 pages.

Chen et al., "A Neural Network System Feature Recognition for Two-Dimensional," International Journal of Computer Integrated Manufacturing, 1998, 11(2):111-117.

Ding et al., "Novel ANN-Based Feature Recognition Incorporating Design by Features," Computers in Industry, 2004, 55:197-222.

Eastman et al., "Geometric Modeling Using the Euler Operators," Institute of Physical Planning, Carnegie Mellon University, 1979, 12 pages.

Gilmer et al., "Neural Message Passing of Quantum Chemistry," arXiv:1704.01212v2, Jun. 2017, 14 pages.

Guibas et al., "Primitives for the Manipulation of General Subdivisions and the Computation of Voronoi Diagrams," 1983, 4:221-234.

Hanocka et al., "MeshCNN: A Network with an Edge," ACM Transactions on Graphics (TOG), 2019, 38(4):1-12.

Henderson et al., "Boundary Representation-Based Feature Identification," Advances in Feature Based Manufacturing, 1994, 20( C):15-38.

Jayaraman et al., "UV-Net: Learning from Curve-Networks and Solids," arXiv:2006.10211v2, 2020, 15 pages.

Jayaraman et al., "UV-Net: Learning from Boundary Representations," arXiv:2006.10211v2, 2021, 18 pages.

Jia et al., "Learning Semantic Image Representations at a Large Scale," 2014, Dissertation in Computer Science in the Graduate Division of the university of California, 103 pages.

Jones et al., "AutoMate: A Dataset and Learning Approach for Automatic Mating of CAD Assemblies," arXiv:2015.12238v2, Oct. 2021, 18 pages.

Joshi et al., "Graph-Based Heuristics for Recognition of Machined Features from a 3D Solid Model," 1988, Computer Aided Design, 9 pages.

Koch et al., "ABC: A Big CAD Model Dataset for Geometric Deep Learning," Proceedings of the IEEE Conference on Computer Vision and Pattern Recognition, 2019, 9601-9611.

Lavoie, "An Introduction to NURBS," on-line tutorial https://linburbs.sourceforge.net/nurbsintro.pdf, 1999, 6 pages.

Le et al., "Going Deeper with Lean Point Networks," IEEE Conference on Computer Vision and Pattern Recognition, 2020, 10 pages.

Lee et al., "Partial Entity Structure: A Compact Non-Manifold Boundary Representation Based on Partial Topological Entities," 2001, 1:159-170.

Ma et al., "Automatic Discovery of Common Design Structures in CAD Models," Computer Graphics, 2010, 34:545-555.

Marquez et al., "Application of Neural Networks in Feature Recognition of Mould Reinforced Plastic Parts," Concurrent Engineering, 1999, 7(2):115-122.

Nezis et al., "Recognizing 2½D Shape Features Using a Neural Network and Heuristics," Computer-Aided Design, 1997, 29(7):523-539.

Niepert et al., "Learning Convolutional Neural Networks for Graphs," 2016, International Conference on Machine Learning, 10 pages.

Prabhakar et al., "Automatic Form-Feature Recognition Using Neural-Network-Based Techniques on Boundary Representations of Solid Models," CAD Computer Aided Design, 1992, 24(7):381-393.

Qi et al., "Pointnet: Deep Learning On Point Sets for 3D Classification and Segmentation," Proceedings of the IEEE Conference on Computer Vision and Pattern Recognition, 2017, 652-660.

Qi et al., "Pointnet++: Deep Hierarchical Feature Learning on Point Sets in a Metric Space," Advances in Neural Information Processing Systems, 2017, 5099-5108.

Sakurai et al., "Recognizing Shape Features in Solid Models," IEEE Computer Graphics and Applications, 1990, 10:22-32.

Shi et al., "A Critical Review of Feature Recognition Techniques," Computer-Aided Design and Applications, 2020, 17:861-899.

Simonovsky et al., "Dynamic Edge-Conditioned Filters in Convolutional Neural Networks on Graphs," 2017 IEEE Conference on Computer Vision and Pattern Recognition (CVPR), 2017, 10 pages.

Staley et al., "Using Syntactic Pattern Recognition to Extract Feature Information from Solid Geometric Database," Computers in Mechanical Engineering, 1983, 6 pages.

Sunil et al., "Automatic Recognition of Machining Features using Artificial Neural Networks," The International Journal of Advanced Manufacturing Technology, 2009, 41:932-947.

United States Patent Application for Machine Learning Techniques for Automating Tasks Based on Boundary Representations of 3D CAD Objects, filed on Jun. 15, 2021, assigned U.S. Appl. No. 17/348,338, 86 pages.

United States Patent Application for "Techniques for Generating UV-Net Representations of 3D CAD Objects for Machine Learning Models", filed on Jun. 15, 2021, assigned U.S. Appl. No. 17/348,295, 86 pages.

United States Patent Application for "Techniques for Training Machine Learning Models to Automate Task Associated with 3D CAD Objects", filed on Jun. 15, 2021, assigned U.S. Appl. No. 17/348,314, 87 pages.

Wang et al., "3D Shape Segmentation via Shape Fully Convolutional Networks," Computers & Graphics, 2018, 76:182-192.

Wang et al., "Dynamic Graph CNN for Learning on Point Clouds," CoRR, abs/1801.07829, 2018, 12 pages.

Weiler, "Topological Structures for Geometric Modelling," Technical Report RPI, Center for Interactive Computer Graphica, University Microfilms, 1986, 346 pages.

Wikipedia.com [online]. "Shapemanagers," published on or before Nov. 1, 2021, retrieved on Nov. 1, 2021, retrieved from URL<https://en.wikipedia.org/wiki/shapemanager>, 1 page.

Yue et al., "Study of Neural Network Techniques for Computer Integrated Manufacture," Engineering Computations, 2002, 19:136-157.

(56) References Cited

OTHER PUBLICATIONS

Zhang et al., "Deep Learning on Graphs: A Survey," CoRR, abs/1812.04202, 2018, 20 pages.
Zhang et al., "Featurenet: Machinings Feature Recognition Based on 3D Convolutional Neural Network," Computer-Aided Design, 2018, 101:12-22.

* cited by examiner

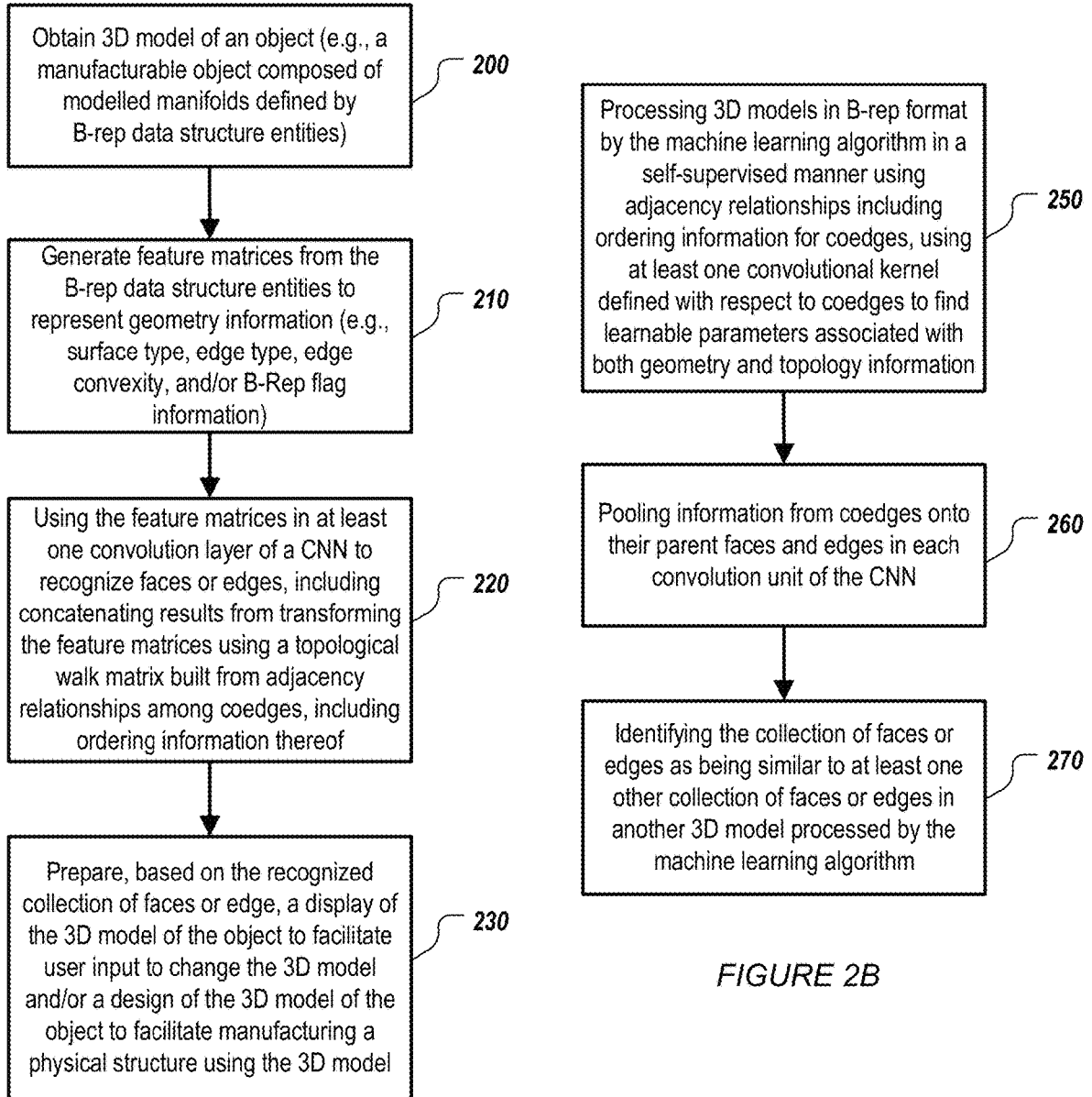

Obtain 3D model of an object (e.g., a manufacturable object composed of modelled manifolds defined by B-rep data structure entities) — 200

Generate feature matrices from the B-rep data structure entities to represent geometry information (e.g., surface type, edge type, edge convexity, and/or B-Rep flag information) — 210

Using the feature matrices in at least one convolution layer of a CNN to recognize faces or edges, including concatenating results from transforming the feature matrices using a topological walk matrix built from adjacency relationships among coedges, including ordering information thereof — 220

Prepare, based on the recognized collection of faces or edge, a display of the 3D model of the object to facilitate user input to change the 3D model and/or a design of the 3D model of the object to facilitate manufacturing a physical structure using the 3D model — 230

*FIGURE 2A*

Processing 3D models in B-rep format by the machine learning algorithm in a self-supervised manner using adjacency relationships including ordering information for coedges, using at least one convolutional kernel defined with respect to coedges to find learnable parameters associated with both geometry and topology information — 250

Pooling information from coedges onto their parent faces and edges in each convolution unit of the CNN — 260

Identifying the collection of faces or edges as being similar to at least one other collection of faces or edges in another 3D model processed by the machine learning algorithm — 270

*FIGURE 2B*

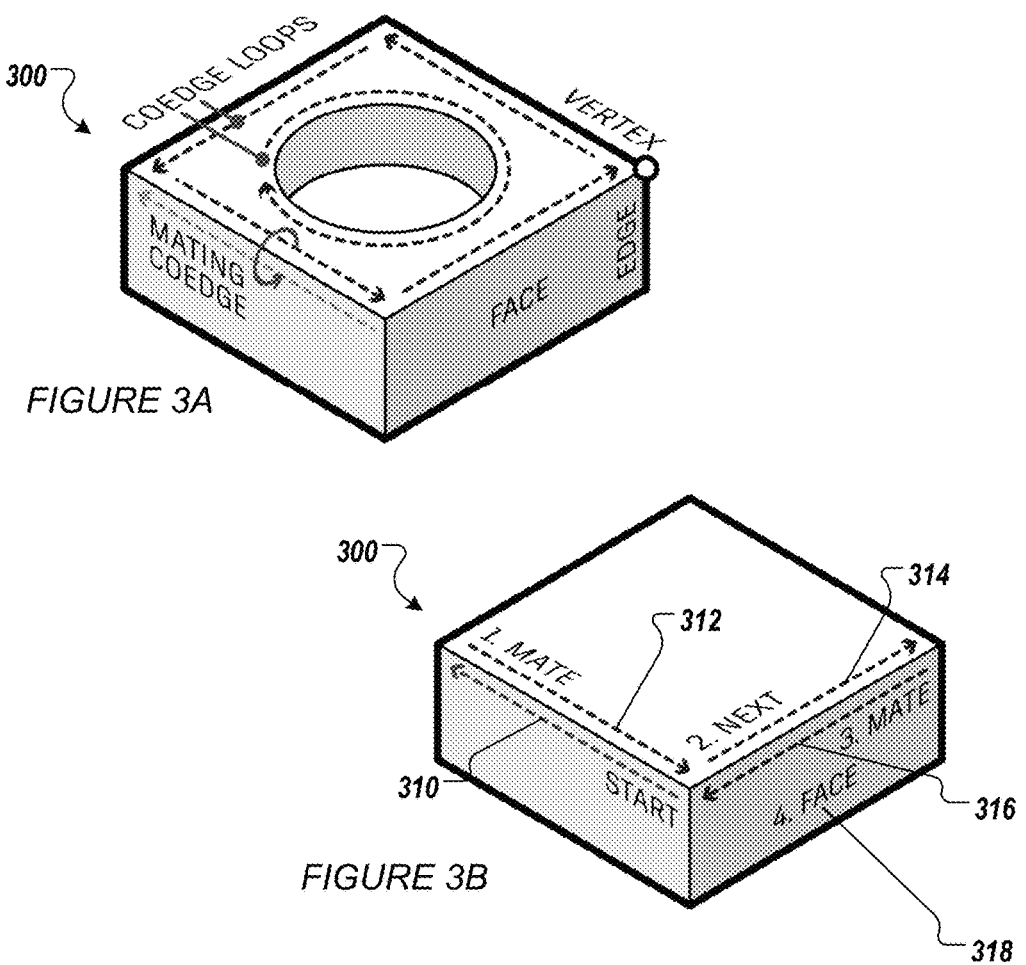
*FIGURE 3A*
*FIGURE 3B*
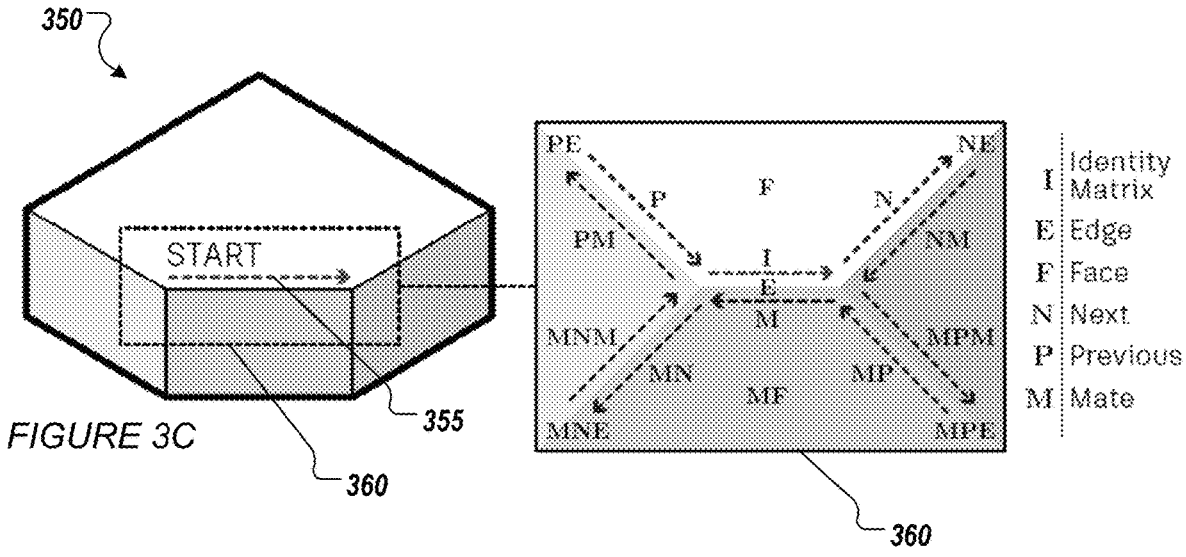
*FIGURE 3C*

1

TOPOLOGICAL MESSAGE PASSING FOR THREE DIMENSIONAL MODELS IN BOUNDARY REPRESENTATION FORMAT

CROSS-REFERENCE TO RELATED APPLICATIONS

This application claims the benefit under 35 U.S.C. § 119(e) of U.S. Patent Application No. 63/113,766, entitled "TOPOLOGICAL MESSAGE PASSING FOR THREE DIMENSIONAL MODELS IN BOUNDARY REPRESEN-TATION FORMAT", filed Nov. 13, 2020, which is incorporated herein by reference in its entirety.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

B-Rep models are the standard way 3D shapes are described in commercial CAD applications/software. They combine trimmed parametric curves and surfaces with topological information which connects the geometric entities to describe manifolds. Prismatic shapes can be represented using lightweight primitive curves and surfaces while free-form objects can be defined using NURBS (Non-Uniform Rational B-Spline) surfaces. While this makes the representation both compact and expressive, the complexity of the data structures and limited availability of labelled datasets has presented a high barrier to entry for researchers.

The task of segmenting B-Rep models is of particular interest as it allows the automation of many laborious manual tasks in Computer Aided Engineering (CAE) and Computer Aided Process Planning (CAPP). Although attempts were made in the 90s and early 2000s to apply neural networks to the task of B-Rep segmentation, the absence of machine learning frameworks and large labelled datasets caused progress to stall until very recently. For example, P. Jayaraman, et al., *UV-net: Learning from curve-networks and solids*, 2020, proposed a unified representation for parametric curve-networks and solids by exploiting the u- and uv-parameter domains of curves and surfaces to model the geometry, and an adjacency graph to explicitly model the topology, which enables the use of a network architecture based on coupled image and graph convolutional neural networks to extract features from curve-networks and solids.

SUMMARY

This specification describes technologies relating to computer aided design of physical structures using topological message passing for three-dimensional (3D) models in boundary representation (B-Rep) format.

A framework for using machine learning to recognize collections of faces or edges on solid models from examples is provided. In a graph, there is no concept of the order of the edges around a given node. Hence in traditional message passing graph networks, convolution is achieved by aggregating messages from neighboring nodes using symmetric functions. In contrast, the convolutions described in this document can aggregate information from neighboring faces, edges and coedges onto a single coedge. Using walks from a starting coedge to other entities in a convolutional kernel for B-Rep models, an analogy can be drawn to the use of sliding filter windows in image convolution neural networks (CNNs). The entities in the convolutional kernel for B-Rep models can be ordered, similar to the pixels in an image convolution, and the feature vectors can be concatenated in this order. The learnable weights can then be applied to specific entities. This avoids the need for symmetric functions. This provides improved performance, e.g., in terms of processing power, memory usage and/or neural network recognition of geometric entities in a three dimensional model.

For example, in contrast with voxel based approaches for feature detection, the present systems and techniques can avoid the cubic storage complexity of the voxel representation of an object's volume (rather than its boundary) which puts severe limitations on the size of geometric features that can be detected. As industrial CAD models often contain small but important features, the present systems and techniques are more readily applicable than voxel based approaches using current GPU (Graphical Processing Unit) hardware. As another example, in contrast with point cloud based segmentation, the present systems and techniques can avoid the risk that faces with small areas will be under-sampled and thus incorrectly classified. Further, by working directly on the original B-Rep topology, the present systems and techniques can avoid the requirement (imposed when using a triangle mesh representation of an object) to generate high quality meshes, which can require special meshing procedures and typically results in a less compact representation of the object, i.e., operating directly on the B-Rep data structure can save storage space in the computer system(s). Finally, the present systems and techniques can avoid the loss of information about relative topological locations of nearby entities, as results when using approaches to B-Rep segmentation that translate the B-Rep data structure into a face adjacency graph.

By defining convolutional kernels relative to the coedges of the B-Rep, the neural network architecture can make use of information about the next and previous coedges in the loops around faces, giving better performance than an edge conditioned convolution network with the same number of parameters. Moreover, the systems and techniques described in this document can enable non-experts to quickly create high performing parts at low cost and with minimal environmental footprint, as the algorithms that employ the present systems and techniques can understand the models the program users are creating and recognize geometries which may be inefficient, difficult to manufacture or require unnecessary resources. By providing a framework for learning about characteristic patterns in B-Rep models, knowledge informed tools that understand B-Rep data in this format can be built, and the operations users perform to generate and manipulate the B-Rep data can be improved.

This opens new ways in which the computer can collaborate with the users to assist them in their design and manufacturing workflows.

BRIEF DESCRIPTION OF THE DRAWINGS

FIGS. 2A & 2B show examples of processes of using topological message passing to facilitate recognition of collections of faces or edges on solid models by a machine learning algorithm.

FIG. 3A shows an example of a B-Rep topology including faces, edges, loops, coedges and vertices.

FIG. 3B shows an example of a topological walk on the B-Rep topology shown in FIG. 3A.

FIG. 3C shows an example of a collection of faces, edges and coedges, which can be used to define a convolutional kernel for a machine learning algorithm.

Like reference numbers and designations in the various drawings indicate like elements.

DETAILED DESCRIPTION

A method and a neural network architecture are described, which are designed to operate directly on B-Rep data structures, avoiding the need to approximate the model as meshes or point clouds. Convolutional kernels of the neural network architecture can be defined with respect to oriented coedges in the data structure. In the neighborhood of each coedge (also referred to as a halfedge or an oriented edge) a small collection of faces, edges and coedges can be identified and patterns in the feature vectors from these entities detected by specific learnable parameters. The feature vectors are arrays of numbers generated from information about the geometry of each face and edge extracted from the solid in B-Rep format. Thus, the method and neural network architecture can operate directly on the faces and edges of B-Rep data structures and take full advantage of the topological relationships between them. Using this approach, B-Rep models can be segmented with higher accuracy than methods that operate on graphs, meshes, and point clouds.

Figure 1A:
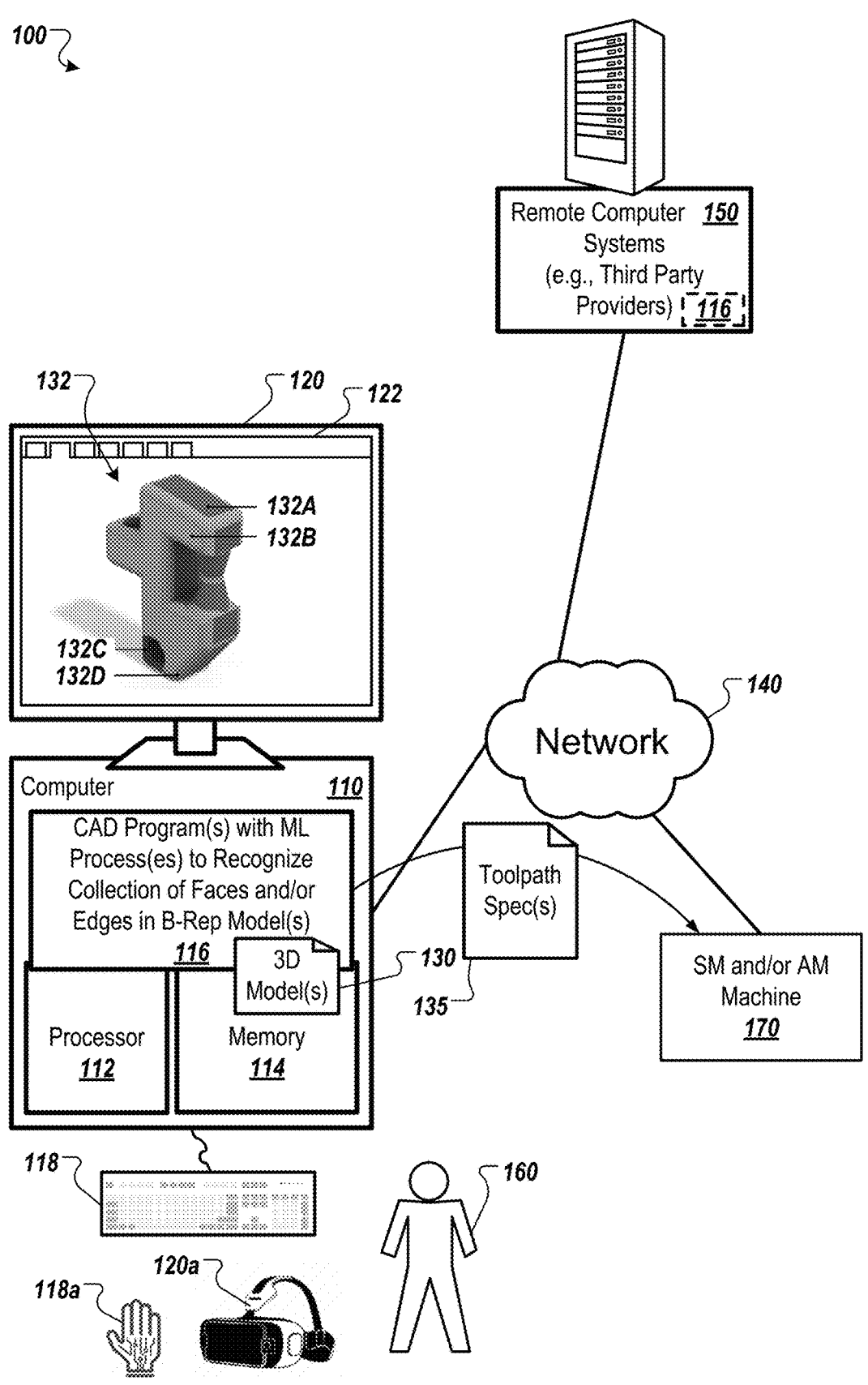
FIG. 1A shows an example of a system usable to design physical structures using topological message passing to recognize collections of faces or edges on solid models.

FIG. 1A shows an example of a system 100 usable to design physical structures using topological message passing to recognize collections of faces or edges on solid models. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes (or is associated with) one or more machine learning (ML) processes that recognize one or more collections of faces and/or edges in one or more B-Rep models.

The CAD program(s) 116 can also employ various other systems and techniques, such as one or more generative design processes for topology optimization (e.g., using at least one level-set method) with physical simulation, as described in U.S. patent application Ser. No. 16/679,065, entitled "CONVERSION OF GEOMETRY TO BOUNDARY REPRESENTATION WITH FACILITATED EDITING FOR COMPUTER AIDED DESIGN AND 2.5-AXIS SUBTRACTIVE MANUFACTURING", filed 8 Nov. 2019, and published on 14 May 2020 as U.S. Patent Pub. No. US-2020-0151286-A1, which is incorporated herein by reference in its entirety. Further, as used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), Computer Aided Process Planning (CAPP) program(s), etc.

The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., segmentation of a 3D B-Rep model 132) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

These 3D models can include B-Rep models, e.g., B-Rep model 132, that are (or have been) processed using the systems and techniques described in this document. Thus, the B-Rep models that are handled by the CAD program(s)

116 can be processed by a machine learning algorithm to recognize at least one collection of faces and/or edges in one or more modelled manifolds defined by a B-Rep data structure, and each such recognized collection of faces and/or edges can be used as a basis for the CAD program(s) 116 to prepare a display of the 3D model of a manufacturable object to facilitate user input to change the 3D model, and/or to prepare a design of the 3D model of the manufacturable object to facilitate manufacturing a physical structure using the 3D model. In the example shown in FIG. 1A, the 3D model 132 is part of a training data set for the ML algorithm, where the 3D model 132 has manifolds that have been labeled according to the CAD modeling operations used to create the 3D model 132, including an Extrude-Side 132A, an Extrude-End 132B, a Chamfer 132C, and a Fillet 132D.

Note that the ML algorithm can be pre-trained before it is used with the CAD program(s) 116, but the ML algorithm can also be trained in an ongoing manner by observing users 160 creating 3D models in the CAD program(s) and labeling the modelled manifolds of those 3D models according to the CAD modeling operations used. In some implementations, timeline data can also be used to assist in 3D model segmentation. In any case, after an appropriate amount of training, the ML algorithm can recognize features of 3D models without the use of information about the CAD modeling operations used, such as when a previously unseen 3D model 132 is loaded or imported from another source. In some implementations, a segmentation dataset is used that contains thousands of 3D models with per-face, per-triangle and per-point segment labels provided for B-Rep, mesh and point cloud representations of each 3D model. For segmentation, a small subset of the most common CAD modeling operations can be used, e.g., extrude, chamfer, fillet, and revolve. Note that more and/or different CAD modeling operations can be used in various implementations.

Also, in order to create a segmentation which contains as much information as possible about the CAD modeling operations, extrude operations can be subdivided into additive (i.e., adding) and subtractive (i.e., cutting) extrusion operations, and the faces that are created can be further divided by extrude and revolve into side and end faces. This gives a set of eight labels for each face: ExtrudeSide, ExtrudeEnd, CutSide, CutEnd, Fillet, Chamfer, RevolveSide, and RevolveEnd. However, other implementations are also possible, including various implementations that consider the order of modelling operations.

For example, the order of modeling operations that create a solid can be discovered based on considering the edges (e.g., during edge classifying) to each have a direction defined by the 3D curve of the edge. Once a direction is defined for an edge, that edge can have a face to its left and a face to its right. Then, for each edge, it can be determined which of three cases applies: (1) the face to the left was created by the same modeling operation as the face to the right, (2) the face to the left was created by an earlier modeling operation than the face to the right, or (3) the face to the left was created by a later modeling operation than the face to the right. Using this information, the order in which the features, which created the model, were applied can be established and used, e.g., to facilitate segmentation.

Other approaches are also possible, including B-Rep segmentation processes that do not use modeling history of the part. For example, a B-Rep model can be segmented according to the roughing or finishing toolpath strategy used to machine each face. A model can be segmented according the manufacturing process used to create each face. For example, faces which need to be created using an electrode machining process can be in one segment type, faces that can be milled can be of another segment type, and faces that need to be drilled can be of a third segment type. As another example, a model can be segmented according to faces which were removed by a user during a de-featuring operation when preparing the model for finite element analysis.

Other types of modelling and/or manufacturing based data can be used. Thus, the CAD program(s) 116 employing the systems and techniques described in this document can use various types of inputs for training to recognize collections of faces and/or edges. Moreover, the CAD program(s) 116 can provide various outputs based on a recognized collection of faces and/or edges.

Figure 1B:
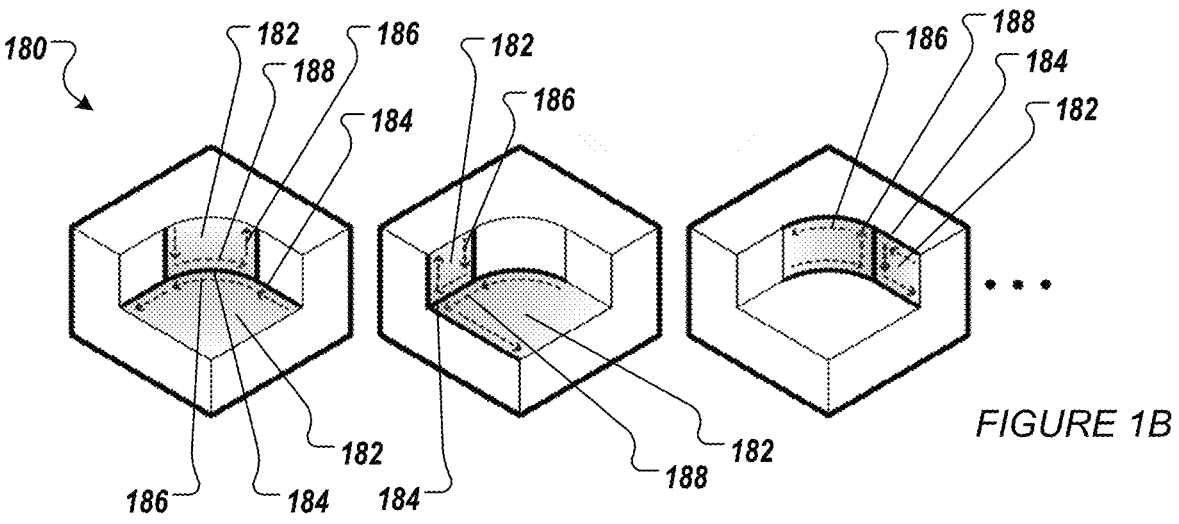
FIGS. 1B-1D shows an example of defining a convolution kernel for a B-Rep model for use by a machine learning algorithm.
Figure 1C:
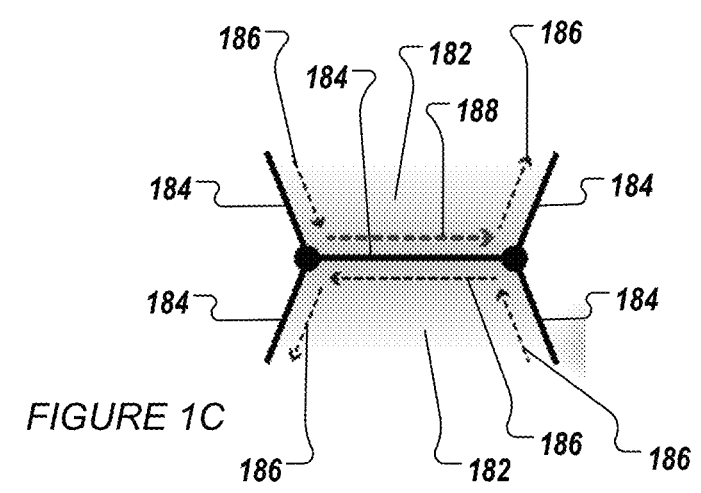
Figure 1D:
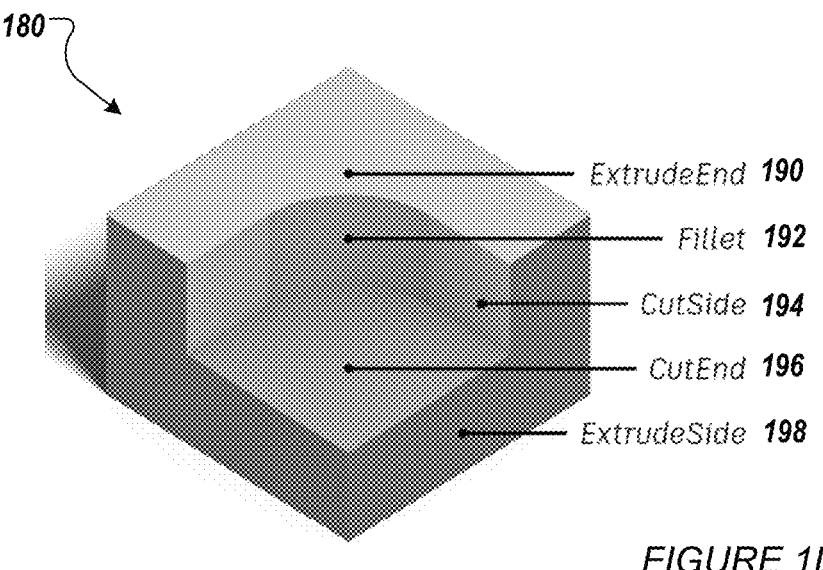

FIG. 1B shows a series of representations of a 3D B-Rep model 180 for which an example of a convolution kernel (for use by the ML algorithm) is shown in FIG. 1C. As shown graphically, the convolutional kernels are defined with respect to topological entities called coedges 186 (dotted arrows). Feature vectors from a collection of faces 182, edges 184 and coedges 186 in the neighborhood of each coedge 188 can be multiplied by the learnable parameters in the kernel. The hidden states arising from the convolution can then be pooled onto the faces to perform segmentation. Once the 3D B-Rep model 180 has been segmented, the identified nature of each face can be designated in the display of the 3D B-Rep model 180. For example, as shown in FIG. 1D, the 3D B-Rep model 180 includes an ExtrudeEnd face 190, a Fillet face 192, a CutSide face 194, a CutEnd face 196, and an ExtrudeSide 198.

The approach described in this document is motivated by the observation that in convolutional neural networks (CNNs) for image processing, the weights operate on pixels with known locations within the filter window. A similar arrangement can be achieved with B-Reps, where a collection of faces, edges and coedges can be identified at well-defined relative locations with respect to each directed coedge in the data structure, as shown in FIGS. 1B and 1C. Feature vectors can be extracted from these neighboring entities and concatenated in a predefined order, allowing convolution to take place as a matrix/vector multiplication. As in image convolution, specific entities relative to each coedge map to specific learnable parameters in the convolutional kernels, allowing patterns in the input data to be readily recognized. Thus, the network architecture uses a convolution technique that takes full advantage of the topological information the B-Rep stores. Moreover, the described direct use of B-Rep data solves the segmentation problem with higher performance and parameter efficiency than other techniques based on point cloud and mesh representations. In particular, it should be noted that use of loop ordering information is useful for solving the segmentation problem for B-Reps.

Returning to FIG. 1A, in some implementations, the CAD program(s) 116 can prepare a display of the 3D model of a manufacturable object to facilitate input by the user 160 to change the 3D model 132. For example, the CAD program(s) 116 can modify the display of the 3D model 132 by designating the at least one collection of faces or edges in the display of the 3D model 132, the CAD program(s) 116 can modify the display of the 3D model 132 by designating a suggested completion of a user selection of the at least one collection of faces or edges in the display of the 3D model 132, and/or the CAD program(s) 116 can modify the display of the 3D model 132 by alerting the user 160 about a suitability of the 3D model 132 for at least one predefined downstream process, e.g., subtractive and/or additive manufacturing. Further, in some implementations, the CAD program(s) 116 can prepare a design of the 3D model of a manufacturable object to facilitate manufacturing a physical structure using the 3D model. For example, the CAD program(s) 116 can modify the design of the 3D model 132 by manipulating geometry of the at least one collection of faces or edges to automate a predefined workflow, the CAD program(s) 116 can modify the design of the 3D model 132 by removing a feature in the 3D model 132 (in accordance with the at least one collection of faces or edges) to prepare the three dimensional model for use in a finite element analysis simulation of physical properties of the physical structure to be manufactured, and/or the CAD program(s) 116 can prepare the design of the 3D model 132 by producing one or more toolpath strategies to machine the physical structure during the manufacturing.

Once the user 160 is satisfied with the 3D model 132, as designed, the 3D model 132 can be stored as a 3D model document 130 and/or used to generate another representation of the model (e.g., toolpath specifications for subtractive manufacturing). This can be done upon request by the user 160, or in light of the user's request for another action, such as sending the 3D model 132 to a subtractive manufacturing (SM) and/or additive manufacturing (AM) machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

The CAD program(s) 116 can provide a document 135 (having toolpath specifications of an appropriate format) to the SM and/or AM machine 170 to manufacture a complete structure. An SM machine 170 can employ one or more subtractive manufacturing techniques, e.g., a Computer Numerical Control (CNC) milling machine, such as a multi-axis, multi-tool milling machine. An AM machine 170 can employ one or more additive manufacturing technique, such as Fused Filament Fabrication (FFF) and Selective Laser Sintering (SLS). In addition, the user 160 can save or transmit the 3D model for later use. For example, the CAD program(s) 116 can store the document 130 that includes the generated 3D model.

FIG. 2A shows an example of a process of using topological message passing to facilitate recognition of collections of faces or edges on solid models by a machine learning algorithm. A structural modelling program, e.g., CAD program(s) 116, obtains 200 a 3D model of an object. This can involve loading the 3D model from a computer-readable medium, producing the 3D model in response to user input through the structural modelling program, or a combination thereof. The 3D model can be a B-Rep model of a manufacturable object, where the B-Rep model is composed of modelled manifolds defined by B-Rep data structure entities. These B-Rep data structure entities can include trimmed parametric surfaces and coedges associated with the trimmed parametric surfaces, where the coedges specify topological information for the trimmed parametric surfaces, and the topological information includes adjacency relationships among the coedges including ordering information including next and previous coedges around a parent face of a given coedge.

Industrial CAD packages have internal data structures that support the modeling of 2-dimensional manifolds, 3-dimensional volumes and even non-manifold complexes, which can arise as intermediate states in Boolean operations. FIG. 3A shows an example of a B-Rep topology 300 including faces, edges, loops, coedges and vertices. A face is a connected region of the model's surface which may have internal holes. An edge defines the curve where two faces meet and a vertex defines the point where edges meet. Faces have an underlying parametric surface which is divided into visible and hidden regions by a series of boundary loops.

Each loop consists of a doubly linked list of directed edges called coedges, which are topological entities used to represent the adjacency relationships in the B-Rep. A coedge stores pointers to the next and previous coedge in the loop, its adjacent or "mating" coedge, its parent face and parent edge. In the following description, the focus is on closed and manifold B-Reps where each coedge has exactly one mating coedge, providing sufficient information for the edges in the structure to be traversed in the same way as in the winged edge and QuadEdge data structures. However, the systems and techniques described in this document are applicable to modelled manifolds that include one or more closed manifolds representing one or more modelled solids, one or more open manifolds representing one or more modelled sheet bodies, or a combination thereof.

By following the pointers, which the coedges store, a program can walk from a given coedge on the B-Rep to entities in its neighborhood. The choice of which pointer to follow at each hop can be thought of as a sequence of instructions which will take the program from some starting coedge to a destination coedge. From there, the program can optionally make a jump to the owner (parent) edge or face of the destination coedge. This sequence of instructions defines a topological walk.

FIG. 3B shows an example of a topological walk, on the B-Rep topology 300, for the following instruction sequence: mate, next, mate, face. Starting from a given coedge 310, the topology can be traversed by following the sequence of instructions, which indicate which entity to move to in the next hop. In this example, the instruction sequence walks the to the mate coedge 312, then to the next coedge 314, then to the mate coedge 316, and finally to the parent face 318 for coedge 316. As will be appreciated, various different topological walks can be used in various implementations.

Returning to FIG. 2A, in general, the structural modelling program, e.g., CAD program(s) 116, generate 210 feature matrices from the B-Rep data structure entities, where the feature matrices represent geometry information for the B-Rep model. The geometry information for the trimmed parametric surfaces can include surface type information associated with faces of the trimmed parametric surfaces. For example, the surface type information can include plane, cylinder, cone, sphere, torus, B-spline, NURBS, or any combination thereof. The geometry information for the trimmed parametric surfaces can include curve type information associated with edges of the trimmed parametric surfaces. For example, the curve type information can include line, circle, ellipse, helix, intersection curve, or any combination thereof. Moreover, the geometry information for the trimmed parametric surfaces can include convexity information associated with edges of the trimmed parametric surfaces. For example, the convexity information can include convex, concave, smooth, or any combination thereof.

In any case, the structural modelling program, e.g., CAD program(s) 116, uses 220 the feature matrices in at least one convolution layer of a convolutional neural network (CNN) of a machine learning algorithm to recognize at least one collection of faces or edges in the one or more modelled manifolds of the 3D model of the object. This use 220 of the feature matrices includes concatenating 220 results of transforming the feature matrices using at least one topological walk matrix built from data of the B-Rep data structure entities to represent the topological information for the trimmed parametric surfaces of the B-Rep model. Note that the data (of the B-Rep data structure entities) used includes the adjacency relationships among the coedges including the ordering information, which includes at least next and previous coedges around a parent face of a given coedge.

For a B-Rep containing a set of faces $f=\{f_1, f_2, \ldots, f_{|f|}\}$, edges $e=\{e_1, e_2, \ldots, e_{|e|}\}$, and coedges $c=c_1, c_2, \ldots, c_{|c|}$, geometric information can be extracted and used to build three input feature matrices $X^f \in \mathbb{R}^{|f| \times p}$, $X^e \in \mathbb{R}^{|e| \times q}$ and $X^c \in \mathbb{R}^{|c| \times r}$ for the face features, edge features and coedge features, respectively. Further detailed examples of this feature extraction process are provided below. In addition, the next, previous and mating adjacency relationships between coedges can be written as three matrices:

$$N, P, M \in \{0, 1\}^{|c| \times |c|} \qquad (1)$$

Here $N_{ij}=1$ indicates that $c_j$ is the next coedge in the loop from $c_i$ and $M_{ij}=1$ when coedge $c_1$ is the mate of coedge $c_j$. As each coedge has exactly one next, previous and mating coedge, these matrices simply define permutations on the list of coedges in the B-Rep. Also, as the coedges form a doubly linked list, it can see that $P=N^{-1}=N^T$. A matrix defining a topological walk between two coedges can then be built by multiplying N, P and M in the sequence in which the next, previous and mate instructions appear in the walk.

FIG. 3C shows an example of a collection of faces, edges and coedges, which can be used to define a convolutional kernel for a CNN machine learning algorithm. A B-Rep topology 350 includes a starting coedge 355 from which various topological walks 360 can be described in terms of products of the incidence matrices. As shown in FIG. 3C, a matrix defining a topological walk between two coedges can be built by multiplying N, P, M, F and E, in the sequence specified by the topological walk being used. Thus, the walks from the starting coedge 355 to neighbouring entities can be described in terms of products of the incidence matrices N, P, M, F and E.

The relationships between a coedge and its parent face and parent edge can also be represented using incidence matrices $F \in \{0,1\}^{|c| \times |f|}$ and $E \in \{0,1\}^{|c| \times |e|}$. Here $F^{ij}=1$ indicates that coedge $c_i$ is in a loop around face $f_j$, and $E_{ij}=1$ indicates that coedge $c_i$ belongs to edge $e_j$. The matrix F allows the program to transform the matrix of face features $X^f$ to a matrix $\Psi \in \mathbb{R}^{|c| \times p}$ by copying the ith row of $X^f$ to the jth row of $\Psi$ for each coedge $c_j$ with parent face $f_i$. The matrix E works in a similar way for edges. Topological walks which terminate on faces or edges can then be represented in matrix form by multiplying by the matrix for the walk over the coedges by E or F.

With regard to input feature extraction, geometric feature information from the faces, edges and coedges of the B-Rep can be passed into the network (for the machine learning algorithm) in the feature matrices $X^f$, $X^e$ and $X^c$. In some implementations, the extraction of geometric features from B-Rep faces can use the approach described in P. Jayaraman, et al., *UV-net: Learning from curve-networks and solids,*

2020, where grids of points and normal vectors are sampled from the parametric surface geometry and compressed into feature vectors using a CNN, and also described in (a) U.S. patent application Ser. No. 17/348,295, titled "TECHNIQUES FOR GENERATING UV-NET REPRESENTATIONS OF 3D CAD OBJECTS FOR MACHINE LEARNING MODELS", which issued on Apr. 29, 2025 as U.S. Pat. No. 12,288,013, (b) U.S. patent application Ser. No. 17/348, 314, titled "TECHNIQUES FOR TRAINING MACHINE LEARNING MODELS TO AUTOMATE TASKS ASSOCIATED WITH 3D CAD OBJECTS", which published on Oct. 6, 2022 as U.S. Publication No. 2022-0318636 A1, and (c) U.S. patent application Ser. No. 17/348,338, titled "MACHINE LEARNING TECHNIQUES FOR AUTOMATING TASKS BASED ON BOUNDARY REPRESENTATIONS OF 3D CAD OBJECTS", which published on Oct. 6, 2022 as U.S. Publication No. 2022-0318637 A1, each of which was filed on Jun. 15, 2021, and each of which is incorporated herein by reference in its entirety. However, in some implementations, the segmentation problem can be solved without providing the network (for the machine learning algorithm) with any coordinate information, instead using only a small amount of extremely concise information from the B-Rep data structure.

For example, for face features, the network (for the machine learning algorithm) can be given a one-hot vector encoding of the possible surface types (e.g., plane, cylinder, cone, sphere, torus, B-spline, and NURBS), and one additional value can be used to indicate a rational NURBS surface. In the case of non-rational B-splines, all these values can be set to zero. Moreover, the network (for the machine learning algorithm) can also be provided with "mass" type properties, such as the area of each face or the length of each edge.

For edge features, a one-hot vector can be provided, which encodes the possible kinds of edge geometry (e.g., line, circle, ellipse, helix, and intersection curve). Edge convexity can be encoded in three one-hot values (e.g., concave edge, convex edge, and smooth edge). One additional flag can be used to indicate if an edge forms a closed loop. Finally, the edge length can be added. For coedges, the network (for the machine learning algorithm) can be passed a single flag indicating whether the coedge is aligned with the 3D curve of the edge. The input features can be standardized over the training set and the same scaling can be applied to the validation and test sets. Note that using these coordinate free input features has the advantage that they are invariant to translation and rotation.

Figure 3D:
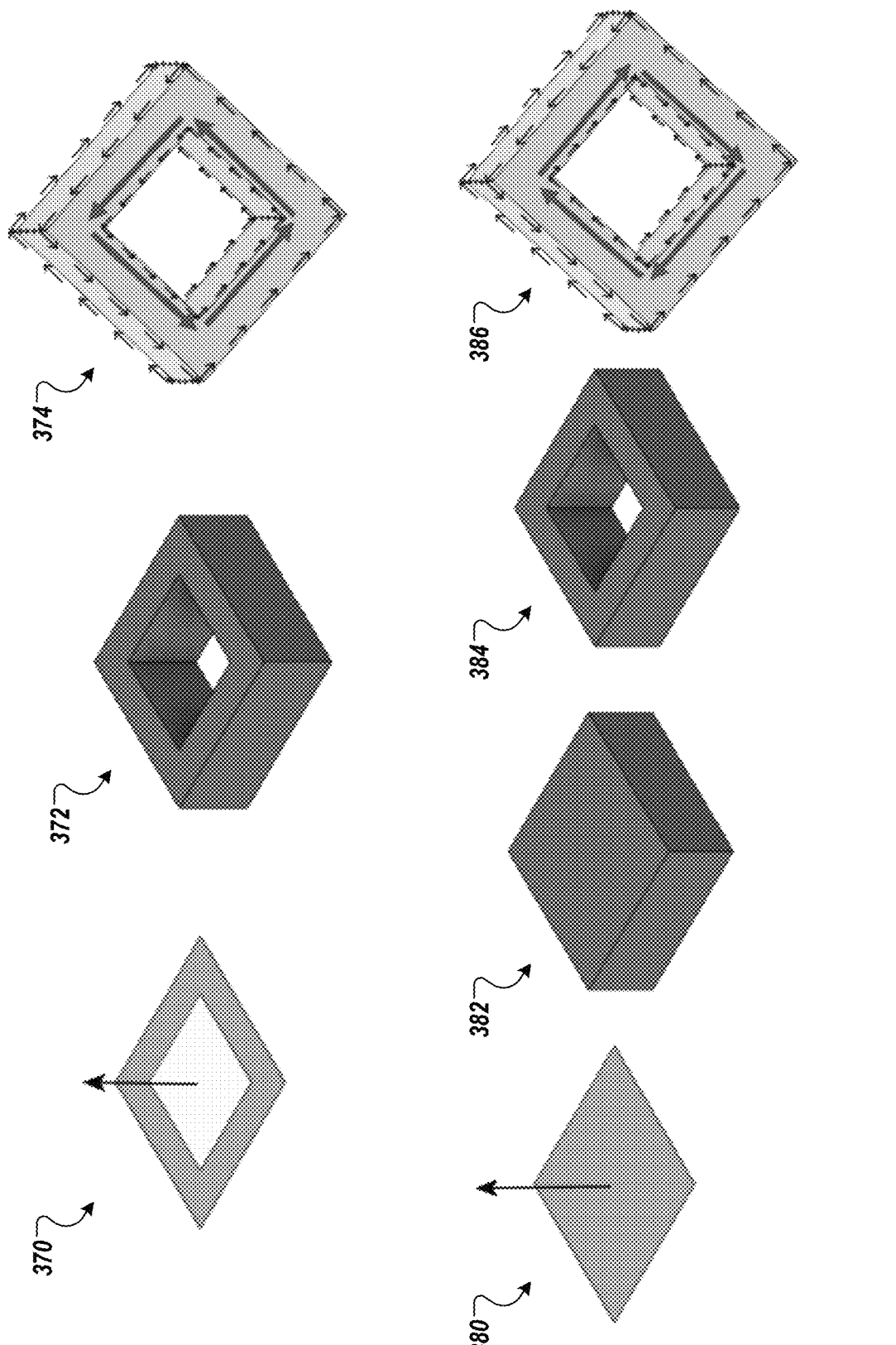
FIG. 3D shows an example of different modeling operations that produce identical geometry.

In addition, it should be noted that the B-Rep data structure contains a number of Boolean flags that can be used as input to train the machine learning model. For example, a flag that indicates whether the 3D curve of an edge runs in the same direction as a given coedge can be used, and using this flag can have a significant impact on performance since it is useful for distinguishing between different modeling operations which give rise to identical geometry (even when the modeling operations are not tracked and used). FIG. 3D shows an example of different modeling operations that produce identical geometry.

As shown, a first surface 370 is extruded to form a first solid 372, and a second surface 380 is extruded to form a second solid 382, which is then cut to form a third solid 384. But even though the geometry of the first and third solids 372, 384 are identical, the B-Rep models 374, 386 for the first and third solids 372, 384 reveal the differences in how those solids were created in the directional information of the edges and coedges. Other input flag features can be used in addition to (or instead of) the flag indicating whether a coedge has the same direction as the 3D curve of its associated edge (e.g., the "orientation" flag in the STEP standard B-Rep data structure), including a flag indicating whether the normal direction of a face is parallel to the normals of the underlying surface (e.g., the "same_sense" flag in the STEP standard B-Rep data structure), and a flag indicating whether a coedge is the coedge referenced by the parent loop (note that some B-Rep kernels may implement this as the first coedge to be accessed from the list of coedges in the loop).

As will be appreciated, there are various formats for B-Rep files, which have different specific flags associated with B-Rep entities that are interpreted by a given B-Rep modeling software that loads such files. But even though different modeling software supports slightly different flags, the different modeling software programs typically provide some form of the B-Rep flag information discussed here. Thus, in some implementations, the generation 210 of feature matrices from the B-Rep data structure entities (see FIG. 2A) includes representing geometry information for the B-Rep model based on the B-Rep flag information. Therefore, the geometry information for the trimmed parametric surfaces can include boundary representation flag information indicating (i) whether a coedge has a same direction as a curve of its associated edge, (ii) whether a normal direction of a face is parallel to normals of an underlying surface, (iii) whether a coedge is the coedge referenced by the parent loop, or some combination thereof. In general, the geometry information about the trimmed parametric surfaces can include boundary representation flag information indicating an orientation of a face, an edge, a coedge, a surface, or a curve.

Various approaches can be employed to provide the network (for the machine learning algorithm) with the concise information from the B-Rep data structure. In general, the collections of faces or edges are represented using vectors of numbers for faces, edges and coedges in a multi-dimensional embedding space. In addition, using the feature matrices in one or more convolution layers of a CNN of the machine learning algorithm can involve identifying similarity between a current collections of faces and/or edges and previously seen collections of faces and/or edges.

FIG. 2B shows another example of a process of using topological message passing to facilitate recognition of collections of faces or edges on solid models by a machine learning algorithm. The process of FIG. 2B includes training the machine learning algorithm and running the machine learning algorithm to identify similarity between a currently obtained 200 3D model and previously seen 3D models. Multiple 3D models in B-Rep format can be processed 250 by the machine learning algorithm in a self-supervised manner using adjacency relationships including ordering information for coedges, where the processing 250 uses at least one convolutional kernel defined with respect to coedges to find learnable parameters associated with both geometry and topology information within a region of a three dimensional model.

Thus, one or more convolutional kernels used in the CNN can be defined relative to the coedges of the B-Rep. As coedges are directed, this removes the ambiguity between the faces to the left and right of a coedge and avoids the need to aggregate features using symmetric functions. The relative topological locations between a starting coedge and the faces, edges and coedges which will take part in a convolution can be defined by topological walks. As discussed above, in connection with the example of FIG. 3C, each walk can be expressed in matrix form by multiplying the matrices N, P, M, F and E in the order in which the next, previous, mate, face or edge instructions must be executed. The products of the matrices required to reach each of the destination entities are shown in the example of FIG. 3C. The matrices encoding the walks to faces, edges and coedges can be arranged in three lists $K^f$, $K^e$ and $K^c$, respectively.

A forward pass through the network can proceed as follows. Start by initializing the matrices $$H_f^{(0)} = X^f, H_f^{(0)} = X^e \text{ and } H_f^{(0)} = X^c.$$

Figures 4, 5, 6A:
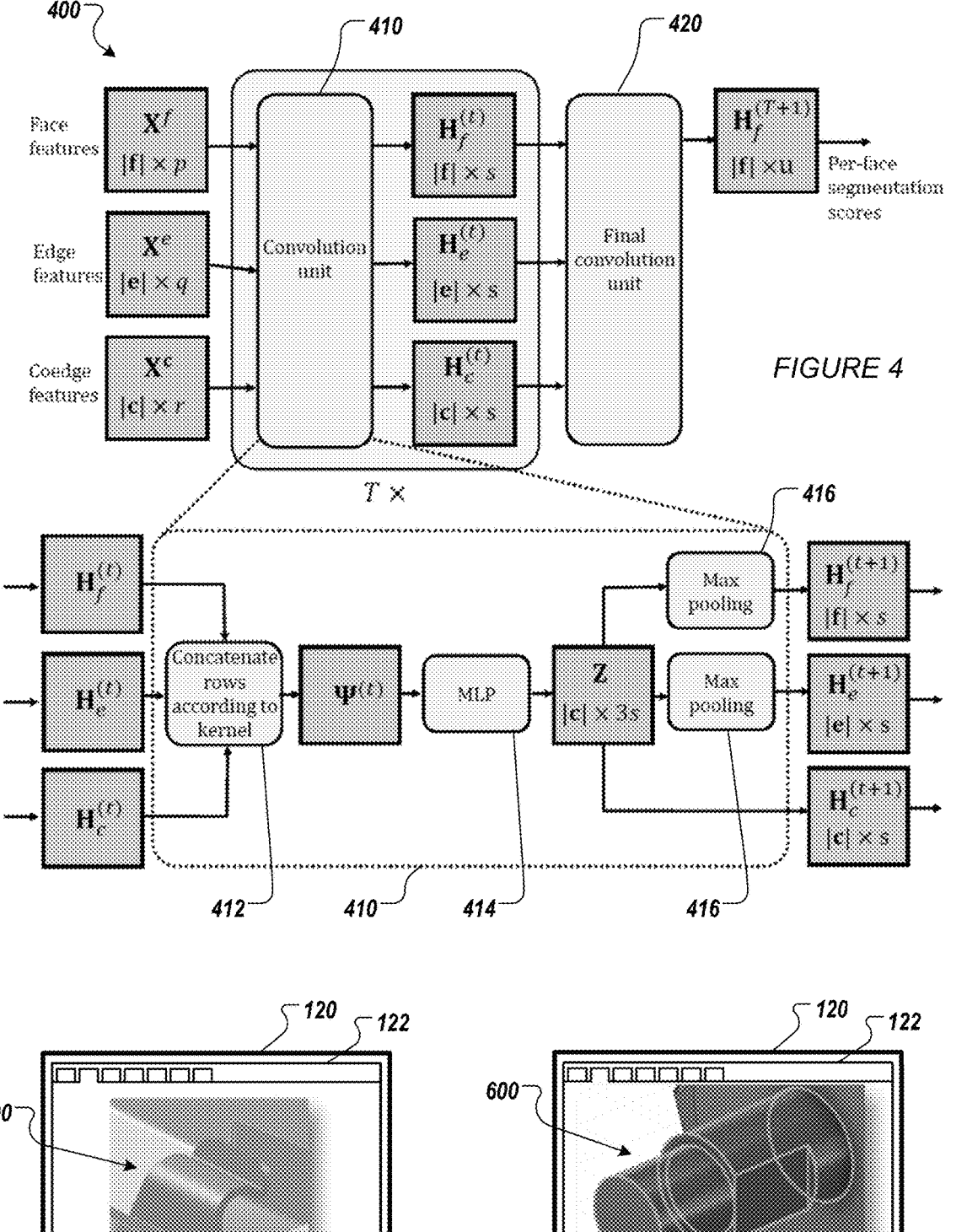
FIG. 4 shows an example of a network architecture for use with the machine learning algorithm.
FIG. 5 shows an example designation of a recognized form in a 3D model.
FIGS. 6A-6C show examples of assisting a user by completing the selection of a set of faces or edges.

These three matrices can then be passed through a number of convolution units. FIG. 4 shows an example of a network architecture 400 for use with the machine learning algorithm. Following convolution unit t 410 the hidden state matrices $$H_f^{(t)}, H_e^{(t)} \text{ and } H_c^{(t)}$$

are generated. The width of these hidden states can be defined by a hyper-parameter, s. For face classification tasks, a final convolution unit 420 generates only matrix $$H_f^{(T+1)}$$

$\in \mathbb{R}^{|f| \times u}$, which includes the per-face segmentation scores for each of the u classes. Thus, in some implementations, the input feature vectors from faces, edges and coedges can be passed through a stack of T convolution units to generate hidden states $$H_f^{(t)}, H_e^{(t)} \text{ and } H_c^{(t)},$$

and a final convolution 420 unit generates only the segmentation scores for faces.

In some implementations, inside each convolution unit three processes take place. First, a matrix $\Psi$ can be built, where $$\Psi^f = \overset{|K^f|}{\underset{i=1}{\|}} K_i^f H_f^{(t)} \quad \Psi^e = \overset{|K^e|}{\underset{i=1}{\|}} K_i^e H_e^{(t)} \qquad (2)$$

$$\Psi^c = \overset{|K^c|}{\underset{i=1}{\|}} K_i^c H_c^{(t)} \quad \Psi = \Psi^f \| \Psi^e \| \Psi^c$$

This procedure populates the ith row of $\Psi$ with the concatenated hidden state vectors of the entities defined by the kernel with starting coedge $c_i$ (e.g., concatenate 412 rows according to kernel).

Second, each row of $\Psi$ can be passed through a multi-layer perceptron (MLP) 414 with learnable parameters $\theta^{(t)}$ and ReLU non-linearities following each layer. The input to the first layer of the MLP 414 depends on the number of columns of $\Psi$ while all other MLP layers can have a size that is three times the width of the hidden states s.

Following the MLP 414, a matrix $Z \in \mathbb{R}^{|c| \times 3s}$ is generated, and the rows of Z are associated with coedges in the B-Rep.

A simple architecture would pass the single matrix Z to the subsequent convolution units, however experimentation has shown that this simple approach can give poor performance on B-Rep models where faces have multiple loops. In this case, the edges of the B-Rep do not form a connected graph and information cannot flow between the loops of multi-loop faces. The performance of the network is greatly enhanced by pooling information from the coedges onto their parent faces and edges in each convolution unit. This allows information to flow from the coedges in one loop onto the parent face, making it accessible to coedges in another loop in subsequent layers.

To apply this pooling, the matrix Z is can be first split into three sub-matrices of size $|c| \times s$.

$$Z = \left[ H_c^{(t+1)} Z^f Z^e \right] \qquad (3)$$

$$H_c^{(t+1)}$$

is the matrix of hidden states for the coedges in the next layer, which requires no further processing. To build the matrices $$H_f^{(T+1)} \text{ and } H_e^{(t+1)},$$

the program can apply the following element wise max pooling 416 procedure to $Z^f$ and $Z^e$:

$$h_i^f = \frac{\max}{j} \left\{ z_j^f, \forall c_j \in C(f_i) \right\} \qquad (4)$$

$$h_i^e = \frac{\max}{j} \left\{ z_j^e, \forall c_j \in C(e_i) \right\}$$

Here $$h_i^f$$

is the ith row of $$H_f^{(t+1)}, z_j^f$$

is the jth row of $Z^f$, and $C(f_i)$ is the set of coedges with parent face $$f_i \text{ and } h_i^e, z_j^e$$

and $C(e_i)$ have equivalent meanings for edges. The matrices and operations performed in each convolution unit are shown in FIG. 4.

For face classifications, the per-face segmentation scores for each class $u_i$ can be calculated as follows. In the final convolution unit 420, the last layer of the MLP has just $|u|$ neurons and produces only the matrix $Z^f \in \mathbb{R}^{|c| \times |u|}$. The matrix of segmentation scores, $H^{(T+1)} \in \mathbb{R}^{|f| \times |u|}$, is then built by pooling the coedge feature vectors onto their parent faces using equation 4 as above.

Thus, in some implementations (returning to FIG. 2B), running the machine learning algorithm (in which the feature matrices are used in the at least one convolution layer) includes pooling 260 information from coedges onto their parent faces and edges in each convolution unit of the convolutional neural network. In addition, as noted above, using 220 the feature matrices in the at least one convolution layer of the convolutional neural network of the machine learning algorithm (to recognize the at least one collection of faces or edges) can include identifying 270 the at least one collection of faces or edges as being similar to at least one of multiple other collections of faces or edges in other 3D models processed by the machine learning algorithm. Various measures of similarity can be used, e.g., in accordance with a particular multi-dimensional embedding space being used. For example, the identifying 270 can use similarity of the vectors of numbers assessed using cosine similarity or Euclidean distance.

Further, in some implementations, a segmentation dataset can be produced from designs submitted by users of the structural modelling program (e.g., CAD, CAM, CAE, and/or CAPP programs), and segmentation can be based on the modeling operations used, as described above in connection with FIG. 1A. However, this is not required in all implementations. Nonetheless, using such information can improve the program's understanding of how people design 3D models, which is useful (beyond 3D model segmentation) for predicting modeling operations a user may want to engage in, and is a natural first step toward geometry synthesis and CAD reconstruction.

In any case, the structural modelling program, e.g., CAD program(s) 116, prepares 230, based on the at least one collection of faces or edges recognized by the machine learning algorithm, either a display of the 3D model of the object to facilitate user input to change the 3D model, or a design of the 3D model of the object to facilitate manufacturing a physical structure using the 3D model. In some implementations, the preparing 230 includes modifying the display of the 3D model by designating the at least one collection of faces or edges in the display of the three dimensional model. For example, the CAD program(s) 116 can use the machine learning framework described in this document to recognize a collection of faces or edges with a characteristic shape or form, and then flag this recognized portion of the 3D model for the user of the CAD program(s) 116.

FIG. 5 shows an example designation of a recognized form in a 3D model. In this example, a recognized portion 500 of a 3D model has been designated by rendering the model portion 500 with a highlighting color in the UI 122 on the display device 120. But other designations can also be used, including rendering in the UI 122 the name of the model portion 500 that has been recognized, either on the model portion 500 or connected to the model portion 500 by a lead line.

In some implementations, the preparing 230 includes modifying the display of the 3D model by designating a suggested completion of a user selection of the at least one collection of faces or edges in the display of the 3D model. For example, the CAD program(s) 116 can use the machine learning framework described in this document to recognize a collection of faces or edges, and then assist the user in completing selections of those faces or edges based on how the same user (or other users) did previous selections on similar collections of faces or edges previously. FIG. 6A shows an example of assisting a user by completing the selection of a set of faces or edges. In this example, a recognized portion 600 of a 3D model has been designated by rendering edges of the model portion 600 with a high-lighting color in the UI 122 on the display device 120. The highlighting indicates to the user what the CAD program(s) 116 views as the full set of edges to be selected, and the user can then confirm this in the UI 122, saving substantial time during the design process.

Figures 6B, 6C:
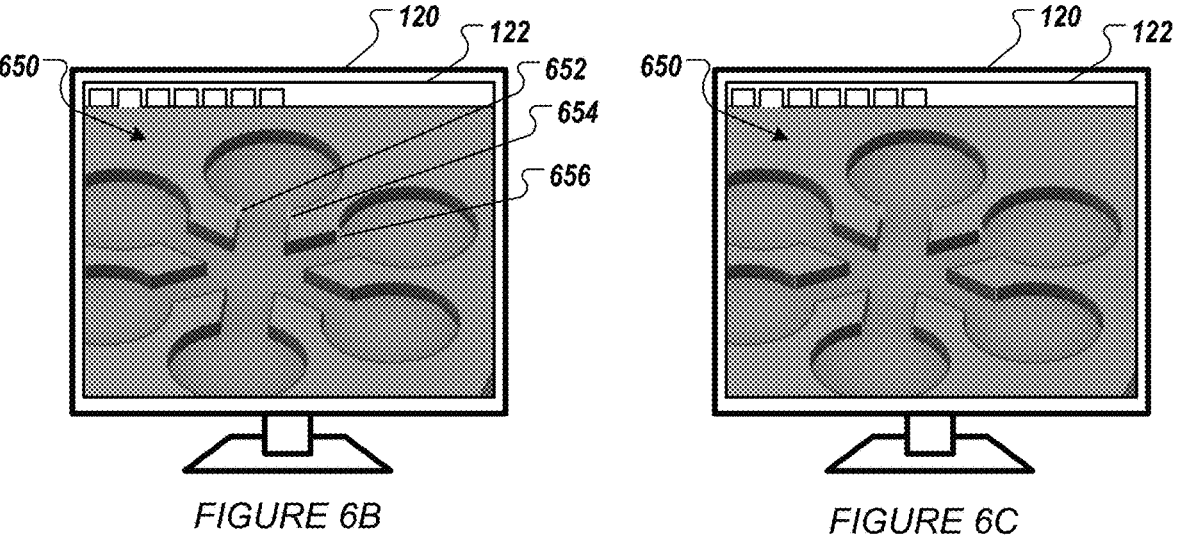

In addition, it should be noted that the similar collections of faces or edges, which are used by the CAD program(s) 116 to predict the user's desired selections, can all be in the same 3D model on which the user is working. FIGS. 6B & 6C show another example of assisting a user by completing the selection of a set of faces or edges. In this example, a 3D model 650 is rendered in the UI 122 on the display device 120, and the 3D model 650 includes six features that are recognized as being similar to each other. In view of this similarity, when the user selects edges 652 & 654, and then the user selects edge 656, as shown in FIG. 6B, it can be inferred that the user wants to select all the same edges on the similar features in the 3D model 650, as shown in FIG. 6C. This prediction of future user selections can be desig-nated by rendering those edges of the 3D model 650 with a highlighting color in the UI 122 on the display device 120. And as before, the highlighting indicates to the user what the CAD program(s) 116 views as the full set of edges to be selected, and the user can then confirm this in the UI 122, saving substantial time during the design process. Finally, while the examples here relate to selection of edges, the same process can be applied to selection of other 3D model entities, such as faces.

In some implementations, the preparing 230 includes modifying the display of the 3D model by alerting a user about a suitability of the 3D model for at least one pre-defined downstream process. The at least one predefined downstream process can be a manufacturing process or a structural performance process. For example, the manufac-turing process can be a subtractive manufacturing (SM) process or an additive manufacturing (AM) process, and the CAD program(s) 116 can alert the user if an aspect of the 3D model is not suitable for a selected manufacturing process, such as the 3D model having fixturing problems (for SM), overhang problems (for AM), or tool accessibility problems (for SM or AM).

Figure 7:
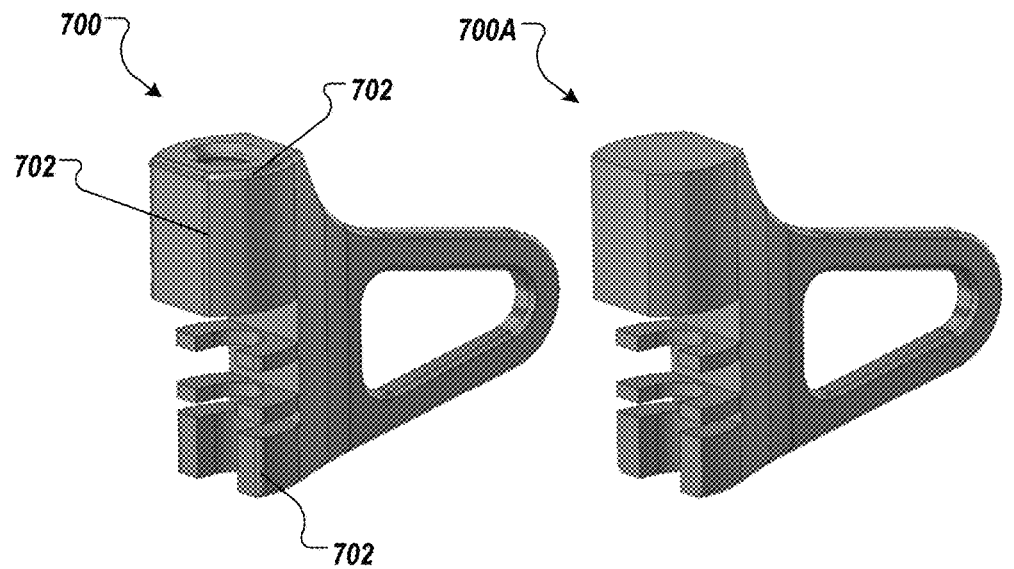
FIG. 7 shows an example of de-featuring.

In some implementations, the preparing 230 includes modifying the design of the 3D model by removing a feature in the 3D model, in accordance with the at least one collection of faces or edges, to prepare the 3D model for use in a finite element analysis (FEA) simulation of physical properties of the physical structure to be manufactured. For example, FIG. 7 shows a B-Rep model 700 that includes features (in this example, fillets 702) that are not needed when running finite element simulations. Thus, these fea-tures 702 can be automatically removed to create a simpli-fied model 700A for FEA simulation of physical properties of the physical structure to be manufactured, in order to speed up the FEA process, without sacrificing the utility of the FEA results.

In some implementations, the preparing 230 includes modifying the design of the 3D model by manipulating geometry of the at least one collection of faces or edges to automate a predefined workflow. For example, the loop order information for the recognized collection of faces or edges can be used by the CAD program(s) 116 to produce one or more edges that effectively bridge across a hole, as part of a hole filling workflow. As another example, the CAD program(s) 116 can learn from prior user choices whether a particular piece of a 3D model should be in the core or the cavity for a part to be manufactured by injection molding.

In some implementations, the preparing 230 includes preparing the design of the 3D model by producing one or more toolpath strategies to machine the physical structure during the manufacturing. For example, the CAD program(s) 116 can automate various CAM operations, such as choosing a 2D pocket operation, selecting faces of a 3D model, and then creating a toolpath for machining. In general, various different operations of a structural model-ling program can be improved using the systems and tech-niques described in this disclosure.

Various experiments were done to quantify the improve-ments of the described approach to B-Rep segmentation. These experiments have shown that loop ordering informa-tion is useful for solving the task B-rep segmentation. The impact on performance, when the incidence relations in the matrices N and P are withheld from the architecture, was assessed, and a range of kernel configurations were explored. The features passed to the network were analyzed to identify the key information used to generate the seg-mentation and to provide insights into why these features are important. The present systems and techniques are com-pared against an Edge-Conditioned Convolution (ECC) graph network. The ECC architecture is chosen for com-parison as it can ingest the same input features as the described CNN architecture, but employs no special tech-niques to exploit the manifold nature of the B-Rep. As such this comparison shows the gains which can be made when specific kernel weights operate on specific neighboring nodes.

The data was divided into a 70%/15%/15% train/valida-tion/test split. In each of the experiments, the networks were trained for 50 epochs, and the weights which gave the smallest validation loss value were recorded. The perfor-mance of these trained models on the test set was then evaluated. The process was repeated 10 times with different random seeds. The reported values are the average over these 10 runs and the error bars are computed as the standard deviation.

Two metrics were used to evaluate network performance: accuracy and intersection over union (IoU). Due to data imbalance in the segmentation dataset used, the IoU metric is useful for providing insight into the performance on the rarer classes. Rather than computing IoU values for indi-vidual B-rep models and then averaging, the entire collec-tion of all faces in the test set was considered at once. This methodology has been referred to as "part IoU" and avoids the special case when a given B-rep model has no faces either predicted or in the ground truth for a given class. The IoU metric is computed as $$IoU = \frac{1}{|u|}\sum\nolimits_{i=1}^{|u|}\frac{TP_i}{TP_i + FN_i + FP_i} \tag{5}$$

where $TP_i$, $FN_i$ and $FP_i$ are the number of true positives, false negatives and false positives for class $u_i$ respectively.

Figure 8A:
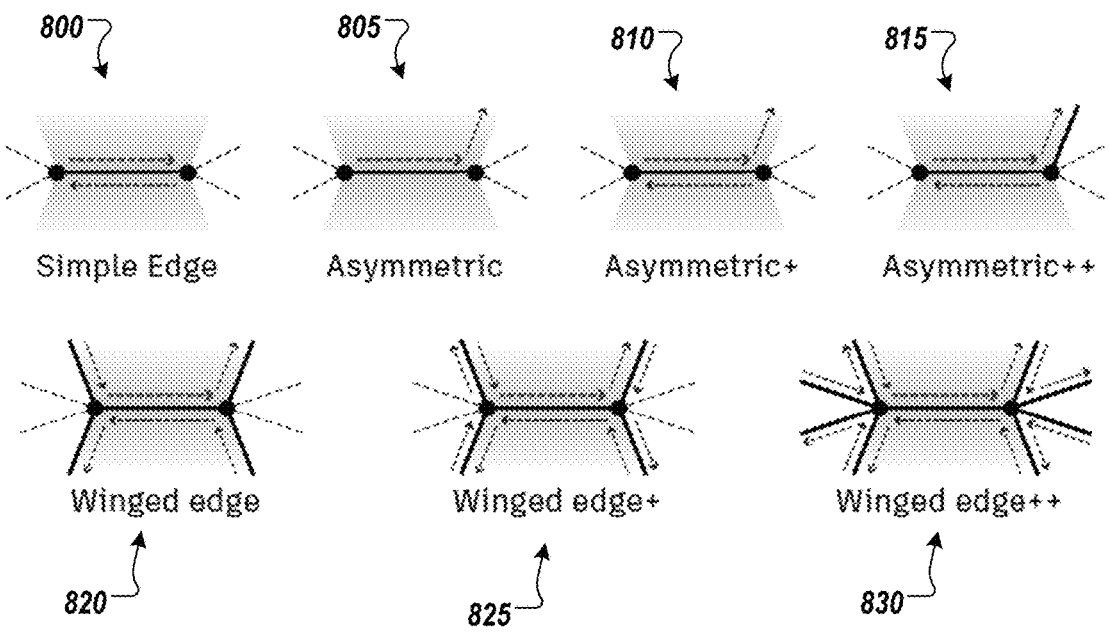
FIG. 8A shows different kernel configurations for which the accuracy and intersection over union (IoU) are compared.

With regard to choosing a kernel, the described CNN architecture provides a flexible framework for defining the relative topological locations of the entities which make up a convolutional kernel, and the choice of these entities can affect the performance of the network. FIG. 8A shows different kernel configurations (Simple Edge 800, Asymmetric 805, Asymmetric+ 810, Asymmetric++ 815, Winged edge 820, Winged edge+ 825, and Winged edge++ 830) for which the accuracy and IoU were compared. As the number of parameters in the MLP is dependent on the number of entities in the kernel, the hyper-parameter s was adjusted to keep the total number of network parameters as close as possible to 360 k. This decouples the effect of aggregating information from a wider region of the B-rep and the effects of increasing network capacity. For each kernel configuration, a network was trained with two convolutional units, each with a two layer MLP. The accuracy and IoU for each kernel configuration is shown in Table 1 below, along with the values of s and the corresponding number of network parameters.

TABLE 1

| Kernel | s | $|\Theta|$ | Accuracy % | IoU % |
|---|---|---|---|---|
| Simple edge | 120 | 359k | 91.02 ± 0.20 | 74.03 ± 0.55 |
| Asymmetric | 120 | 359k | 91.66 ± 0.17 | 75.01 ± 0.54 |
| Asymmetric+ | 113 | 358k | 91.82 ± 0.13 | 75.06 ± 0.71 |
| Asymmetric++ | 107 | 359k | 92.05 ± 0.07 | 75.69 ± 0.38 |
| Winged edge | 84 | 359k | 92.52 ± 0.15 | 77.10 ± 0.54 |
| Winged edge+ | 75 | 357k | 92.50 ± 0.15 | 76.86 ± 0.47 |
| Winged edge++ | 63 | 358k | 92.50 ± 0.12 | 77.14 ± 0.44 |
| ECC | 153 | 360k | 90.36 ± 0.23 | 72.08 ± 0.50 |

Note that the accuracy and IoU for the ECC graph network (discussed below) is also shown in Table 1 above.

Using the data shown in Table 1, the ability of the network to exploit loop ordering information can be evaluated. The Simple Edge 800 and Asymmetric 805 kernels were carefully chosen to have the same number of faces, edges and coedges, allowing them to be compared directly without any adjustments in the MLP width. The Simple Edge 800 arrangement contains only an edge and its two adjacent faces and coedges, giving it information similar to a face adjacency graph, but withholding information regarding the order in which coedges are arranged around the loop. The Asymmetric 805 kernel includes the next coedge in the loop in place of the mating coedge, allowing the kernel to observe patterns like contiguous smooth edges. A 0.98% improvement in IoU was observed when moving from the Simple Edge kernel 800 to the Asymmetric kernel 805. While this improvement is less than 2 standard deviations, a Welch's unequal variances t-test gives a P value of 0.0012 for this result, indicating that the coedge ordering information is useful for the segmentation task.

The Winged edge kernel configuration 820 achieves an accuracy of 92.52% and an IoU of 77.10%, over 5 standard deviations above IoU value achieved by the Simple Edge kernel 800. Adding additional entities to the kernel results in only very marginal gains as shown in Table 1. This can be understood intuitively as the Winged edge kernel 820 includes a compact set of topological entities immediately adjacent to a given edge. When the kernel is expanded beyond this size, the locations at which the topological walks terminate become dependent on the B-Rep topology in the vicinity of the edge. For example the Winged edge++ kernel configuration 830 includes walks like NMN and MPM which will evaluate to the same entity when walking around vertices of valance 3, but will be distinct entities when the vertex has valance 4 or higher. The Winged edge kernel 820 lies at a sweet spot containing enough entities to allows patterns in local regions of the B-Rep topology to be recognized, while being small enough not to be adversely affected by differences in the topology.

It should be noted that the diagrams of the kernels in FIG. 8A show the entities taking part in these kernels, with each kernel being mapped onto a local topology, which allows the entities found by the topological walks to be distinct. For some local topologies, two or more topological walks may terminate on the same entity. A solid cylinder is an extreme case of this. No special case handling is required when this happens. The procedure described in Equation 2 simply concatenates feature vectors from the same entity into the rows of $\Psi$ multiple times. The network learns to recognize these repeated patterns in the feature vectors in the same way as in the case where the entities are distinct.

When implementing the network, efficient index tensors can be used which index into the rows of $H_f$, $H_e$ and $H_c$. These index tensors can be found by following pointers in the B-Rep topology directly in order to evaluate each topological walk. This pre-processing step avoids the need to generate the incidence matrices N, P, M, E and F, or evaluate the matrix products.

TABLE 2

| Kernel | Faces | Edges | Coedges |
|---|---|---|---|
| Simple edge | F, MF | E | I, M |
| Asymmetric | F, MF | E | I, N |
| Asymmetric+ | F, MF | E | I, M, N |
| Asymmetric++ | F, MF | E, NE | I, M, N |
| Winged edge | F, MF | E, NE, PE, MNE, MPE | I, M, N, P, MN, MP |
| Winged edge+ | F, MF | E, NE, PE, MNE, MPE | I, M, N, NM, P, PM, MN, MNM, MP, MPM |
| Winged edge++ | F, MF | E, NE, PE, MNE, MPE, NMNE, PMPE, MPMPE, MNMNE | I, M, N, NM, P, PM, MN, MNM, MP, MPM, NMN, PMP, MPMP, MNMN |

Table 2 above gives the full topological walks which make up the kernels shown diagrammatically in FIG. 8A.

Figure 8B:
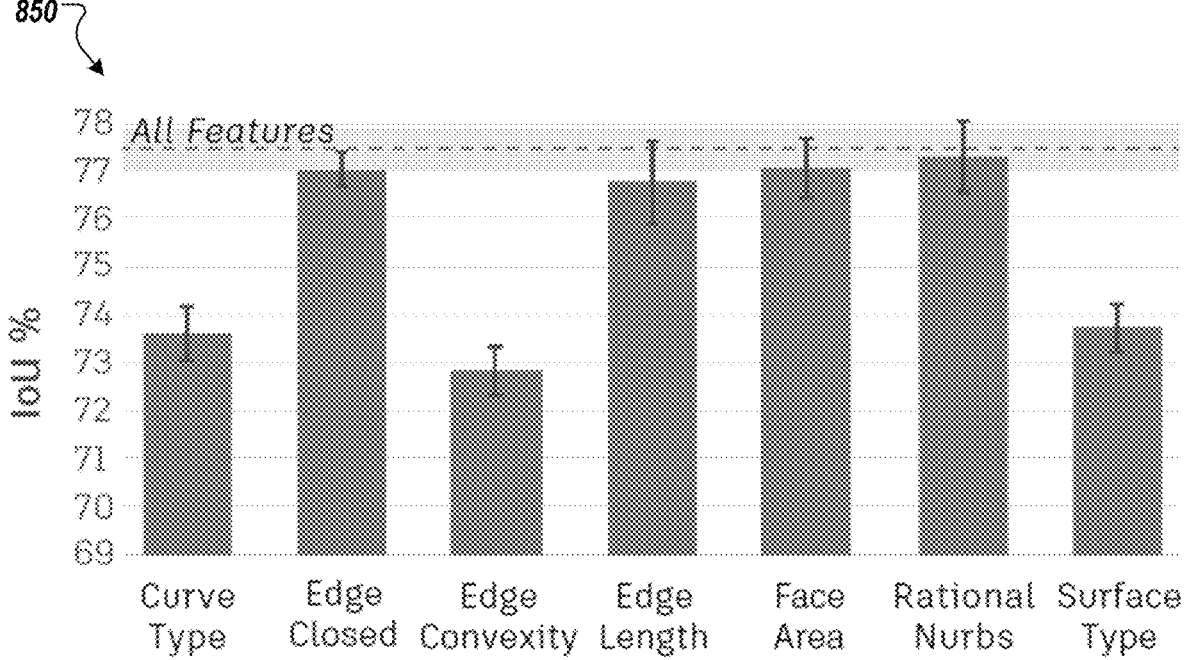
FIG. 8B shows the effects on IoU of removing groups of input features from the neural network.

With regard to ablation of input features, the input features described above were evaluated to identify which play an important role in the results of the classification. The network was trained with groups of input features removed, and the resulting IoU values are shown in FIG. 8B. The Winged edge+ kernel configuration 825 was employed in these experiments, and the hyper parameters were set as described above. These experiments showed that removing the one-hot encodings for surface type reduced IoU by 3.7%, and removing curve type information reduced the IoU by 3.9%. These large reductions in performance were expected as the surface and curve type information is the primary way geometric information is fed to the network.

In addition, a 4.6% reduction in IoU was observed when edge convexity was removed. Edge convexity is well known to be useful for the detection of form features and was used in a large number of early neural networks. An insight into how edge convexity could be useful has been offered with the observation that a face with all convex edges cannot be a part of a concave feature (CutSide or CutEnd).

Removing other input features had much smaller effects. Without the edge length feature, the IoU only decreased by 0.7%, and removing the face area feature caused just a 0.4% IoU decrease. Hence, it can be concluded that edge convexity, curve type and surface type are the primary pieces of information used to by the network to perform the segmentation. However, additional testing has shown that the use of B-Rep flag information indicating orientations can be very useful. When the flag which indicates if a given coedge has the same direction as the 3D curve of the edge is removed, the accuracy drops by 11.56% to 80.96%+/−0.06. The IoU drops by 19.44% to 57.66%+/−1.06. Note that the flag allows the network to distinguish between different modeling sequences which give rise to the same geometry as shown in FIG. 3D.

In addition, the performance of the described CNN architecture was compared with an ECC graph network. As noted above, an important indicator for the class of a face is the convexity of its surrounding edges. As this architecture allows edge attributes to affect the messages passed between faces, it is well suited to the segmentation task. The B-Rep topology was translated into a face adjacency graph with the faces represented as nodes connected by pairs of directed arcs with opposite orientations. The face features $X^f$ were used as input node features. As the directed arcs map 1:1 with the coedges in the B-Rep, the attribute vectors for each directed arc were created by concatenating the corresponding coedge features with the features of its parent B-Rep edge.

The hyper-parameters of the network were matched to those of the described CNN architecture as closely as possible. Two edge-conditioned convolution layers were used, with the edge specific weight matrices computed by two layer MLPs. The width of the first MLP input was defined by the number of face features, and all subsequent widths were set to 153. This gave the ECC network a total of 359,558 parameters, which was the closest possible match to the described CNN architecture. The accuracy and IoU of the ECC network is shown in Table 1. The IoU value achieved was more than 5% below what the described CNN architecture achieved using the Winged edge kernel 820. This was expected as the ECC graph network architecture is not specifically designed for convolution on manifolds and does not employ techniques which map specific learnable parameters to specific entities in the convolution. It could have been expected to see IoU values approximately equal to what the described CNN architecture achieved with the Simple Edge kernel 800, but on the test set used, the ECC gave a 2% lower IoU value. In addition, it was noticed that the described CNN architecture was more stable than the ECC during the training, and it is possible that the poor performance of the ECC on the test set may have been partially be due to the choice of epoch for which the trained model was recorded for use at test time. In all experiments, the model with the lowest validation loss was used when evaluating on the test set.

Figure 9:
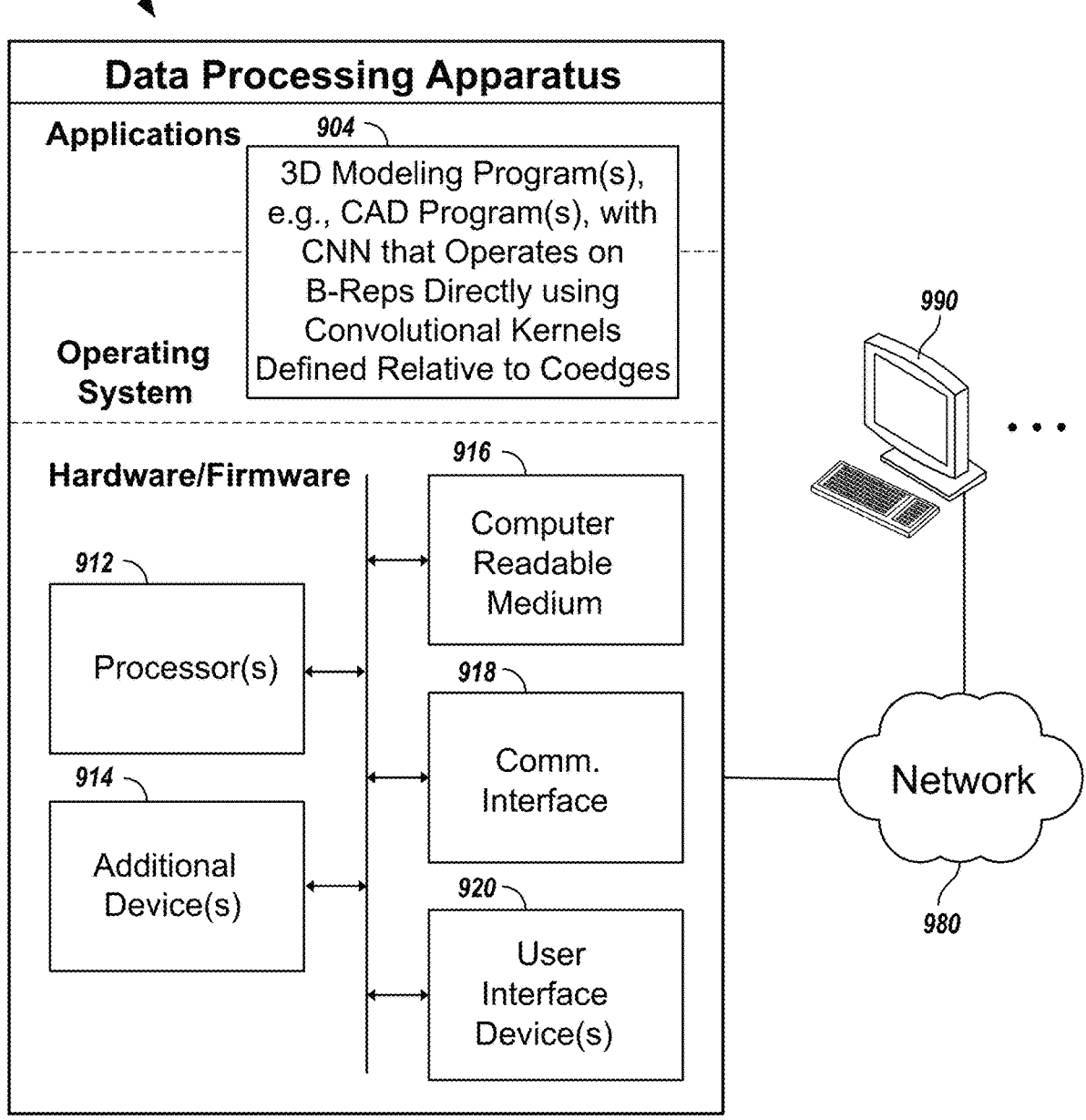
FIG. 9 is a schematic diagram of a data processing system including a data processing apparatus, which can be programmed as a client or as a server.

FIG. 9 is a schematic diagram of a data processing system including a data processing apparatus 900, which can be programmed as a client or as a server. The data processing apparatus 900 is connected with one or more computers 990 through a network 980. While only one computer is shown in FIG. 9 as the data processing apparatus 900, multiple computers can be used. The data processing apparatus 900 includes various software modules, which can be distributed between an applications layer and an operating system. These can include executable and/or interpretable software programs or libraries, including tools and services of one or more 3D modeling programs 904 that implement the systems and techniques described in this document. Thus, the 3D modeling program(s) 904 can be CAD program(s) 116 and can provide an artificial neural network architecture that operates directly on boundary representation models using convolutional kernels defined relative to coedges of the boundary representation models.

The 3D modeling program(s) 904 can provide a framework for learning to recognize collections of faces or edges on a solid from examples. As noted above, various topological walks can be used. In some implementations, a collection of topological walks can define a number of entities in the vicinity of a starting coedge, and the feature vectors extracted from these entities will take part in a convolution. The same process can be repeated a number of times, which can be thought of as a number of different network layers. As the number of layers in the network increases, the information that is "visible" to each edge is gathered from a wider region of the solid. Moreover, to classify faces, information can be averaged from their surrounding edges.

Using the concise surface and edge type information from the B-Rep data structure, the 3D modeling program(s) 904 can employ a CNN network that readily outperforms existing techniques using point clouds and meshes for 3D model segmentation. In addition, by defining convolutional kernels relative to the coedges of the B-Rep, the network architecture used by the 3D modeling program(s) 904 can make use of information about the next and previous coedges in the loops around faces, giving better performance than an edge conditioned convolution network with the same number of parameters.

The number of software modules used can vary from one implementation to another. Moreover, the software modules can be distributed on one or more data processing apparatus connected by one or more computer networks or other suitable communication networks. The data processing apparatus 900 also includes hardware or firmware devices including one or more processors 912, one or more additional devices 914, a computer readable medium 916, a communication interface 918, and one or more user interface devices 920. Each processor 912 is capable of processing instructions for execution within the data processing apparatus 900. In some implementations, the processor 912 is a single or multi-threaded processor. Each processor 912 is capable of processing instructions stored on the computer readable medium 916 or on a storage device such as one of the additional devices 914. The data processing apparatus 900 uses the communication interface 918 to communicate with one or more computers 990, for example, over the network 980. Examples of user interface devices 920 include a display, a camera, a speaker, a microphone, a tactile feedback device, a keyboard, a mouse, and VR and/or AR equipment. The data processing apparatus 900 can store instructions that implement operations associated with the program(s) described above, for example, on the computer readable medium 916 or one or more additional devices 914, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:
1. A method comprising:
obtaining, in a structural modelling program, a three dimensional model of a manufacturable object comprising one or more modelled manifolds defined by boundary representation data structure entities comprising (i) trimmed parametric surfaces and (ii) coedges associated with the trimmed parametric surfaces, wherein the coedges specify topological information for the trimmed parametric surfaces, and the topological information comprises adjacency relationships among the coedges including ordering information comprising next and previous coedges around a parent face of a given coedge;

generating, by the structural modelling program, feature matrices from the boundary representation data structure entities, wherein the feature matrices represent geometry information about the trimmed parametric surfaces;

using, by the structural modelling program, the feature matrices in at least one convolution layer of a convolutional neural network of a machine learning algorithm to recognize at least one collection of faces or edges in the one or more modelled manifolds, wherein using the feature matrices in the at least one convolution layer comprises concatenating results of transforming the feature matrices using at least one topological walk matrix built from data of the boundary representation data structure entities to represent the topological information for the trimmed parametric surfaces, wherein the data comprises the adjacency relationships among the coedges including the ordering information; and preparing, by the structural modelling program and based on the at least one collection of faces or edges recognized by the machine learning algorithm, (i) a display of the three dimensional model of the manufacturable object to facilitate user input to change the three dimensional model or (ii) a design of the three dimensional model of the manufacturable object to facilitate manufacturing a physical structure using the three dimensional model.

2. The method of claim 1, wherein the one or more modelled manifolds comprise at least one closed manifold representing a modelled solid.

3. The method of claim 1, wherein the one or more modelled manifolds comprise at least one open manifold representing a modelled sheet body.

4. The method of claim 1, wherein the geometry information about the trimmed parametric surfaces comprises surface type information associated with faces of the trimmed parametric surfaces.

5. The method of claim 1, wherein the geometry information about the trimmed parametric surfaces comprises curve type information associated with edges of the trimmed parametric surfaces.

6. The method of claim 1, wherein the geometry information about the trimmed parametric surfaces comprises convexity information associated with edges of the trimmed parametric surfaces.

7. The method of claim 1, wherein the geometry information about the trimmed parametric surfaces comprises boundary representation flag information indicating an orientation of a face, an edge, a coedge, a surface, or a curve.

8. The method of claim 7, wherein the geometry information about the trimmed parametric surfaces comprises the boundary representation flag information indicating at least one of (i) whether a coedge has a same direction as a curve of its associated edge, (ii) whether a normal direction of a face is parallel to normals of an underlying surface, or (iii) whether a coedge is the coedge referenced by the parent loop.

9. The method of claim 1, wherein using the feature matrices in the at least one convolution layer of the convolutional neural network of the machine learning algorithm to recognize the at least one collection of faces or edges comprises identifying the at least one collection of faces or edges as being similar to at least one of multiple other collections of faces or edges in other three dimensional models, the other three dimensional models being in boundary representation format and having been previously processed by the machine learning algorithm in a self-supervised manner using adjacency relationships including ordering information for coedges in the other three dimensional models that are processed using at least one convolutional kernel defined with respect to coedges to find learnable parameters associated with both geometry and topology information within a region of a three dimensional model.

10. The method of claim 9, wherein the collections of faces or edges are represented using vectors of numbers for faces, edges and coedges in a multi-dimensional embedding space, and the identifying uses similarity of the vectors of numbers assessed using cosine similarity, Euclidean distance, or another measure of similarity in the multi-dimensional embedding space.

11. The method of claim 10, comprising running the machine learning algorithm in which the feature matrices are used in the at least one convolution layer, and running the machine learning algorithm comprises pooling information from coedges onto their parent faces and edges in each convolution unit of the convolutional neural network.

12. The method of claim 1, wherein the structural modelling program comprises a computer aided design program.

13. The method of claim 1, wherein the structural modelling program comprises a computer aided engineering program.

14. The method of claim 1, wherein the structural modelling program comprises a computer aided manufacturing program.

15. The method of claim 1, wherein the structural modelling program comprises a process planning program.

16. The method of claim 1, wherein the preparing comprises modifying the display of the three dimensional model by designating the at least one collection of faces or edges in the display of the three dimensional model.

17. The method of claim 1, wherein the preparing comprises modifying the display of the three dimensional model by designating a suggested completion of a user selection of the at least one collection of faces or edges in the display of the three dimensional model.

18. The method of claim 1, wherein the preparing comprises modifying the display of the three dimensional model by alerting a user about a suitability of the three dimensional model for at least one predefined downstream process.

19. The method of claim 18, wherein the at least one predefined downstream process comprises a manufacturing process or a structural performance process.

20. The method of claim 1, wherein the preparing comprises modifying the design of the three dimensional model by manipulating geometry of the at least one collection of faces or edges to automate a predefined workflow.

21. The method of claim 1, wherein the preparing comprises modifying the design of the three dimensional model by removing a feature in the three dimensional model, in accordance with the at least one collection of faces or edges, to prepare the three dimensional model for use in a finite element analysis simulation of physical properties of the physical structure to be manufactured.

22. The method of claim 1, wherein the preparing comprises preparing the design of the three dimensional model by producing one or more toolpath strategies to machine the physical structure during the manufacturing.

23. A non-transitory computer-readable medium encoding instructions operable to cause data processing apparatus to perform operations comprising:

obtaining a three dimensional model of a manufacturable object comprising one or more modelled manifolds defined by boundary representation data structure entities comprising (i) trimmed parametric surfaces and (ii) coedges associated with the trimmed parametric surfaces, wherein the coedges specify topological information for the trimmed parametric surfaces, and the topological information comprises adjacency relationships among the coedges including ordering information comprising next and previous coedges around a parent face of a given coedge;

generating feature matrices from the boundary representation data structure entities, wherein the feature matrices represent geometry information about the trimmed parametric surfaces;

using the feature matrices in at least one convolution layer of a convolutional neural network of a machine learning algorithm to recognize at least one collection of faces or edges in the one or more modelled manifolds, wherein using the feature matrices in the at least one convolution layer comprises concatenating results of transforming the feature matrices using at least one topological walk matrix built from data of the boundary representation data structure entities to represent the topological information for the trimmed parametric surfaces, wherein the data comprises the adjacency relationships among the coedges including the ordering information; and preparing, based on the at least one collection of faces or edges recognized by the machine learning algorithm, (i) a display of the three dimensional model of the manufacturable object to facilitate user input to change the three dimensional model or (ii) a design of the three dimensional model of the manufacturable object to facilitate manufacturing a physical structure using the three dimensional model.

24. The non-transitory computer-readable medium of claim 23, wherein the one or more modelled manifolds comprise at least one closed manifold representing a modelled solid.

25. The non-transitory computer-readable medium of claim 23, wherein the one or more modelled manifolds comprise at least one open manifold representing a modelled sheet body.

26. The non-transitory computer-readable medium of claim 23, wherein the geometry information about the trimmed parametric surfaces comprises surface type information associated with faces of the trimmed parametric surfaces.

27. The non-transitory computer-readable medium of claim 23, wherein the geometry information about the trimmed parametric surfaces comprises curve type information associated with edges of the trimmed parametric surfaces.

28. The non-transitory computer-readable medium of claim 23, wherein the geometry information about the trimmed parametric surfaces comprises convexity information associated with edges of the trimmed parametric surfaces.

29. The non-transitory computer-readable medium of claim 23, wherein the geometry information about the trimmed parametric surfaces comprises boundary representation flag information indicating an orientation of a face, an edge, a coedge, a surface, or a curve.

30. The non-transitory computer-readable medium of claim 29, wherein the geometry information about the trimmed parametric surfaces comprises the boundary representation flag information indicating at least one of (i) whether a coedge has a same direction as a curve of its associated edge, (ii) whether a normal direction of a face is parallel to normals of an underlying surface, or (iii) whether a coedge is the coedge referenced by the parent loop.

31. The non-transitory computer-readable medium of claim 23, wherein using the feature matrices in the at least one convolution layer of the convolutional neural network of the machine learning algorithm to recognize the at least one collection of faces or edges comprises identifying the at least one collection of faces or edges as being similar to at least one of multiple other collections of faces or edges in other three dimensional models, the other three dimensional models being in boundary representation format and having been previously processed by the machine learning algorithm in a self-supervised manner using adjacency relationships including ordering information for coedges in the other three dimensional models that are processed using at least one convolutional kernel defined with respect to coedges to find learnable parameters associated with both geometry and topology information within a region of a three dimensional model.

32. The non-transitory computer-readable medium of claim 31, wherein the collections of faces or edges are represented using vectors of numbers for faces, edges and coedges in a multi-dimensional embedding space, and the identifying uses similarity of the vectors of numbers assessed using cosine similarity, Euclidean distance, or another measure of similarity in the multi-dimensional embedding space.

33. The non-transitory computer-readable medium of claim 32, wherein the operations comprise running the machine learning algorithm in which the feature matrices are used in the at least one convolution layer, and running the machine learning algorithm comprises pooling information from coedges onto their parent faces and edges in each convolution unit of the convolutional neural network.

34. The non-transitory computer-readable medium of claim 23, wherein the preparing comprises modifying the display of the three dimensional model by designating the at least one collection of faces or edges in the display of the three dimensional model.

35. The non-transitory computer-readable medium of claim 23, wherein the preparing comprises modifying the display of the three dimensional model by designating a suggested completion of a user selection of the at least one collection of faces or edges in the display of the three dimensional model.

36. The non-transitory computer-readable medium of claim 23, wherein the preparing comprises modifying the display of the three dimensional model by alerting a user about a suitability of the three dimensional model for at least one predefined downstream process.

37. The non-transitory computer-readable medium of claim 36, wherein the at least one predefined downstream process comprises a manufacturing process or a structural performance process.

38. The non-transitory computer-readable medium of claim 23, wherein the preparing comprises modifying the design of the three dimensional model by manipulating geometry of the at least one collection of faces or edges to automate a predefined workflow.

39. The non-transitory computer-readable medium of claim 23, wherein the preparing comprises modifying the design of the three dimensional model by removing a feature in the three dimensional model, in accordance with the at least one collection of faces or edges, to prepare the three dimensional model for use in a finite element analysis simulation of physical properties of the physical structure to be manufactured.

40. The non-transitory computer-readable medium of claim 23, wherein the preparing comprises preparing the design of the three dimensional model by producing one or more toolpath strategies to machine the physical structure during the manufacturing.

41. A system comprising:

a data processing apparatus including at least one hardware processor; and a non-transitory computer-readable medium encoding instructions of a structural modelling program configured to cause the data processing apparatus to perform operations comprising:

obtaining a three dimensional model of a manufacturable object comprising one or more modelled manifolds defined by boundary representation data structure entities comprising (i) trimmed parametric surfaces and (ii) coedges associated with the trimmed parametric surfaces, wherein the coedges specify topological information for the trimmed parametric surfaces, and the topological information comprises adjacency relationships among the coedges including ordering information comprising next and previous coedges around a parent face of a given coedge;

generating feature matrices from the boundary representation data structure entities, wherein the feature matrices represent geometry information about the trimmed parametric surfaces;

using the feature matrices in at least one convolution layer of a convolutional neural network of a machine learning algorithm to recognize at least one collection of faces or edges in the one or more modelled manifolds, wherein using the feature matrices in the at least one convolution layer comprises concatenating results of transforming the feature matrices using at least one topological walk matrix built from data of the boundary representation data structure entities to represent the topological information for the trimmed parametric surfaces, wherein the data comprises the adjacency relationships among the coedges including the ordering information; and preparing, based on the at least one collection of faces or edges recognized by the machine learning algorithm, (i) a display of the three dimensional model of the manufacturable object to facilitate user input to change the three dimensional model or (ii) a design of the three dimensional model of the manufacturable object to facilitate manufacturing a physical structure using the three dimensional model.

42. The system of claim 41, wherein the one or more modelled manifolds comprise at least one closed manifold representing a modelled solid.

43. The system of claim 41, wherein the one or more modelled manifolds comprise at least one open manifold representing a modelled sheet body.

44. The system of claim 41, wherein the geometry information about the trimmed parametric surfaces comprises surface type information associated with faces of the trimmed parametric surfaces.

45. The system of claim 41, wherein the geometry information about the trimmed parametric surfaces comprises curve type information associated with edges of the trimmed parametric surfaces.

46. The system of claim 41, wherein the geometry information about the trimmed parametric surfaces comprises convexity information associated with edges of the trimmed parametric surfaces.

47. The system of claim 41, wherein the geometry information about the trimmed parametric surfaces comprises boundary representation flag information indicating an orientation of a face, an edge, a coedge, a surface, or a curve.

48. The system of claim 47, wherein the geometry information about the trimmed parametric surfaces comprises the boundary representation flag information indicating at least one of (i) whether a coedge has a same direction as a curve of its associated edge, (ii) whether a normal direction of a face is parallel to normals of an underlying surface, or (iii) whether a coedge is the coedge referenced by the parent loop.

49. The system of claim 41, wherein using the feature matrices in the at least one convolution layer of the convolutional neural network of the machine learning algorithm to recognize the at least one collection of faces or edges comprises identifying the at least one collection of faces or edges as being similar to at least one of multiple other collections of faces or edges in other three dimensional models, the other three dimensional models being in boundary representation format and having been previously processed by the machine learning algorithm in a self-supervised manner using adjacency relationships including ordering information for coedges in the other three dimensional models that are processed using at least one convolutional kernel defined with respect to coedges to find learnable parameters associated with both geometry and topology information within a region of a three dimensional model.

50. The system of claim 49, wherein the collections of faces or edges are represented using vectors of numbers for faces, edges and coedges in a multi-dimensional embedding space, and the identifying uses similarity of the vectors of numbers assessed using cosine similarity, Euclidean distance, or another measure of similarity in the multi-dimensional embedding space.

51. The system of claim 50, wherein the operations comprise running the machine learning algorithm in which the feature matrices are used in the at least one convolution layer, and running the machine learning algorithm comprises pooling information from coedges onto their parent faces and edges in each convolution unit of the convolutional neural network.

52. The system of claim 41, wherein the structural modelling program comprises a computer aided design program.

53. The system of claim 41, wherein the structural modelling program comprises a computer aided engineering program.

54. The system of claim 41, wherein the structural modelling program comprises a computer aided manufacturing program.

55. The system of claim 41, wherein the structural modelling program comprises a process planning program.

56. The system of claim 41, wherein the preparing comprises modifying the display of the three dimensional model by designating the at least one collection of faces or edges in the display of the three dimensional model.

57. The system of claim 41, wherein the preparing comprises modifying the display of the three dimensional model by designating a suggested completion of a user selection of the at least one collection of faces or edges in the display of the three dimensional model.

58. The system of claim 41, wherein the preparing comprises modifying the display of the three dimensional model by alerting a user about a suitability of the three dimensional model for at least one predefined downstream process.

59. The system of claim 58, wherein the at least one predefined downstream process comprises a manufacturing process or a structural performance process.

60. The system of claim 41, wherein the preparing comprises modifying the design of the three dimensional model by manipulating geometry of the at least one collection of faces or edges to automate a predefined workflow.

61. The system of claim 41, wherein the preparing comprises modifying the design of the three dimensional model by removing a feature in the three dimensional model, in accordance with the at least one collection of faces or edges, to prepare the three dimensional model for use in a finite element analysis simulation of physical properties of the physical structure to be manufactured.

62. The system of claim 41, wherein the preparing comprises preparing the design of the three dimensional model by producing one or more toolpath strategies to machine the physical structure during the manufacturing.

* * * * *